(12) United States Patent
Yokota et al.

(10) Patent No.: US 11,994,155 B2
(45) Date of Patent: May 28, 2024

(54) CYLINDER DEVICE

(71) Applicant: KOSMEK LTD., Kobe (JP)

(72) Inventors: Hideaki Yokota, Kobe (JP); Keitaro Yonezawa, Kobe (JP)

(73) Assignee: KOSMEK LTD., Kobe (JP)

( * ) Notice: Subject to any disclaimer, the term of this patent is extended or adjusted under 35 U.S.C. 154(b) by 661 days.

(21) Appl. No.: 17/258,591

(22) PCT Filed: Jul. 30, 2019

(86) PCT No.: PCT/JP2019/029894
§ 371 (c)(1),
(2) Date: Jan. 7, 2021

(87) PCT Pub. No.: WO2020/036060
PCT Pub. Date: Feb. 20, 2020

(65) Prior Publication Data
US 2021/0164499 A1 Jun. 3, 2021

(30) Foreign Application Priority Data

Aug. 17, 2018 (JP) .................... 2018-153569

(51) Int. Cl.
*B23Q 3/08* (2006.01)
*F15B 15/14* (2006.01)
*F15B 15/28* (2006.01)

(52) U.S. Cl.
CPC .......... *F15B 15/2807* (2013.01); *B23Q 3/082* (2013.01); *F15B 15/1409* (2013.01); *F15B 15/1423* (2013.01)

(58) Field of Classification Search
CPC . B23Q 3/06; B23Q 3/082; B23Q 3/10; B23Q 3/106; B23Q 3/107; B23Q 3/108; B23Q 2703/02; B25B 5/006; B25B 5/061; B25B 5/087; B25B 5/12; Y10T 279/1249; F15B 15/1409; F15B 15/1423; F15B 15/2807
(Continued)

(56) References Cited

U.S. PATENT DOCUMENTS

| | | | | |
|---|---|---|---|---|
| 2014/0138890 | A1* | 5/2014 | Kawakami | F15B 15/225 91/1 |
| 2015/0345521 | A1* | 12/2015 | Yokota | F15B 15/2807 91/435 |
| 2018/0156249 | A1* | 6/2018 | Kojima | F15B 15/22 |

FOREIGN PATENT DOCUMENTS

| | | |
|---|---|---|
| EP | 2 949 950 A1 | 12/2015 |
| JP | 2017015237 A | 1/2017 |
| WO | WO-2016208443 A1 * | 12/2016 ............... B23Q 3/06 |

OTHER PUBLICATIONS

Search Report of Jul. 12, 2021 issued in corresponding European application No. 19850167.8.

(Continued)

*Primary Examiner* — Lee D Wilson
*Assistant Examiner* — Alberto Saenz
(74) *Attorney, Agent, or Firm* — BACON & THOMAS, PLLC

(57) ABSTRACT

A plurality of detection valves (12 and 13) are provided to a housing (1), and at least one air passage (14 and 15), which communicatively connects the detection valves (12 and 13) to each other in series, are provided to the housing (1). One or some of the detection valves (12 and 13) are each configured as a throttle detection valve (13) including a throttle passage (56*a*).

7 Claims, 25 Drawing Sheets

(58) Field of Classification Search
USPC ............. 29/559; 269/20, 24, 25, 27, 32, 228
See application file for complete search history.

(56) References Cited

OTHER PUBLICATIONS

Office Action of Jun. 23, 2022 issued in corresponding Korean application No. 10-2021-7001066.
Search Report of Oct. 29, 2019 issued in corresponding International application No. PCT/JP2019/029894.

\* cited by examiner

CYLINDER DEVICE

TECHNICAL FIELD

The present invention relates to a cylinder device including detection valves configured to detect the operational state of a piston.

BACKGROUND ART

Known examples of such a cylinder device include a device described in Patent Literature 1 specified below.

The known device is structured as follows.

Detection valves, which are configured to detect the operational state of a force multiplier provided in a cylinder device, are provided to a housing of the cylinder device. The two detection valves are provided in a lower end portion of the housing. For each of the detection valves, an air supply passage is provided. Namely, first and second air supply passages are respectively provided for the detection valves.

CITATION LIST

Patent Literature

Patent Literature 1: Japanese Unexamined Patent Publication No. 2017-15237

SUMMARY OF INVENTION

Technical Problem

The above-described known device has the following disadvantage. In the known device, the air supply passages are provided to the housing so as to correspond to the respective detection valves. Due to this, two (a plurality of) air supply ports have to be provided onto the housing. Furthermore, in order to detect the operational state of the force multiplier with the two detection valves, a pressure switch has to be provided for each air supply passage.

An object of the present invention is to provide a cylinder device arranged to detect the operational state of a piston by providing detection valves to a housing and configured so that the number of air supply ports can be reduced.

Solution to Problem

In order to achieve the above object, in the present invention, a cylinder device is structured as follows, as shown in FIG. 1 to FIG. 19B, for example.

A cylinder device of an aspect of the present invention includes: a housing 1; a piston 5, 59, 150 inserted in the housing 1, the piston 5, 59, 150 being configured to move in an axial direction to a lock side and to a release side; a plurality of detection valves 12 and 13, 64 and 65, 121 and 122 provided to the housing 1, the detection valves 12 and 13, 64 and 65, 121 and 122 being configured to detect an operational state of the piston 5, 59, 150; and at least one air passage 14 and 15, 66, 125 and 126 provided to the housing 1, the air passage 14 and 15, 66, 125 and 126 communicatively connecting the detection valves 12 and 13, 64 and 65, 121 and 122 to each other in series. One or some of the detection valves 12 and 13, 64 and 65, 121 and 122 are each configured as a throttle detection valve 13, 65, 122 including a throttle passage 56a, 106, 107a, 149.

The cylinder device of the above aspect of the present invention provides the following functions and effects. The detection valves are communicatively connected to each other in series by the air passage. This makes it possible to supply air to the detection valves through a common line. As a result, the number of air supply ports can be reduced. Furthermore, because one or some of the detection valves are each configured as the throttle detection valve, different operational states of the piston can be discriminated based on the difference in air pressure. This makes it also possible to reduce the number of pressure switches.

It is preferable that the cylinder device of the above aspect of the present invention further includes the following features.

The throttle detection valve 13 includes: a valve element 49 movably inserted in a valve chamber 48 provided in the housing 1, the valve element 49 being biased by a biasing means 55 housed in the valve chamber 48; and a valve seat 54a facing a valve surface 53a of the valve element 49, and the throttle passage 56a is provided at a central portion of an end portion of the valve element 49, the end portion being opposite from a rod portion 50. This makes it easy to produce the throttle detection valve.

Furthermore, it is preferable to arrange the cylinder device such that the valve element 49 includes: a valve element body 52, at a first end portion of which the rod portion 50 is provided; and a throttle member 56 fixed to a central portion of a second end portion of the valve element body 52, the second end portion being opposite from the rod portion 50, the throttle member 56 having a hole 56a functioning as the throttle passage.

In this arrangement, the throttle member is a separate element. This makes it possible to conduct a test for pressure drop properties of the throttle passage on the throttle passage independently from other elements.

It is preferable that the cylinder device of the above aspect of the present invention further includes the following features.

The throttle detection valve 57 includes: a valve element 49 movably inserted in a valve chamber 48 provided in the housing 1, the valve element 49 being biased by a biasing means 55 housed in the valve chamber 48; and a valve seat 54a facing a valve surface 53a of the valve element 49, and the valve element 49 has a hole 58 functioning as the throttle passage; or a groove 70 functioning as the throttle passage is provided on the valve surface 53a or on the valve seat 54a. This makes it easy to produce the throttle detection valve.

It is preferable that the cylinder device of the above aspect of the present invention further includes the following feature.

The detection valves 64 and 65 are provided in a lower end portion of the housing 1. This allows the cylinder device to be made compact in size.

It is preferable that the cylinder device of the above aspect of the present invention further includes the following features.

At least one of the detection valves 12 and 13, 64 and 65, 121 and 122 is closed when the operational state of the piston 5, 59, 150 is a lock state, and at least one of the detection valves 12 and 13, 64 and 65, 121 and 122 is closed when the operational state is a release state. This makes the usage of air smaller, and therefore makes the cylinder device advantageous in terms of saving energy.

Advantageous Effects of Invention

According to embodiments of the present invention, it is possible to provide a cylinder device arranged to detect the operational state of a piston by providing detection valves to a housing, and configured so that the number of air supply ports can be reduced.

DESCRIPTION OF EMBODIMENTS

Figure 1:
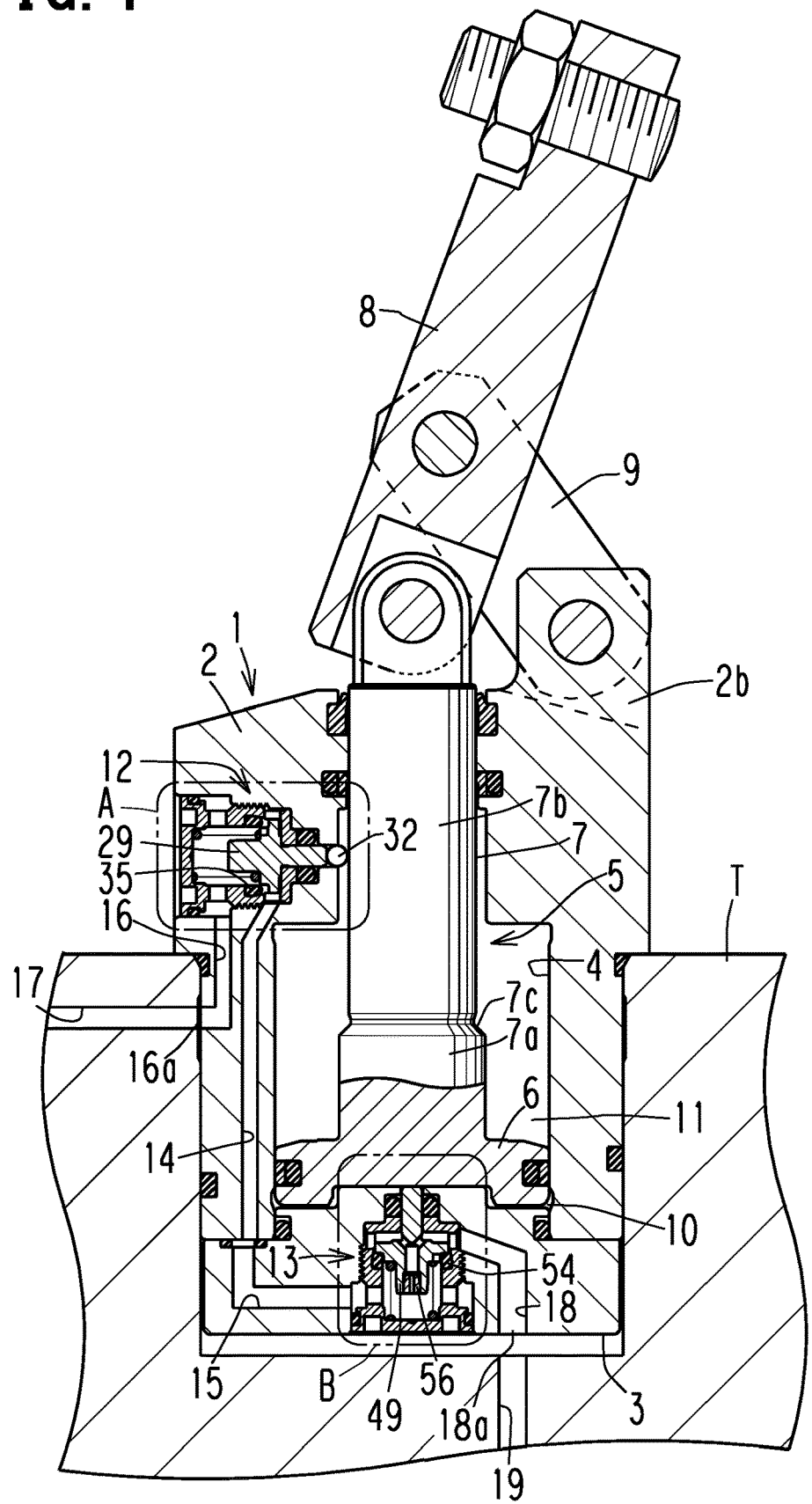
FIG. 1 shows a first embodiment of the present invention, and is an elevational view in section of a cylinder device in a release state.

FIG. 1 to FIG. 5B show a first embodiment of the present invention. This embodiment deals with a case in which the cylinder device of the present invention is applied to a link clamp, by way of example. The structure of a cylinder device of the first embodiment will be described with reference to FIG. 1 to FIG. 5B.

A housing 1 is attached to a stationary stand T such as a table. The housing 1 includes: a housing main body 2; and a lower end wall 3 fixed to a lower end portion of the housing main body 2. A cylinder hole 4 is provided inside the housing main body 2.

A piston 5 is hermetically inserted in the cylinder hole 4 so as to be movable in an up-down direction. The piston 5 has: a piston main body 6; and an output rod 7 extending from the piston main body 6.

A left end portion of a clamp arm 8 is rotatably connected to an upper end portion of the output rod 7. A pivot portion 2b is provided to protrude upward from an upper right portion of the housing main body 2. A lower end portion of a link member 9 is rotatably connected to an upper end portion of the pivot portion 2b. An intermediate portion of the clamp arm 8 in its longitudinal direction is rotatably connected to an upper end portion of the link member 9.

A lock chamber 10 is provided below the piston main body 6, and a release chamber 11 is provided above the piston main body 6. Pressurized oil functioning as pressure fluid for locking is supplied to and discharged from the lock chamber 10. Pressurized oil functioning as pressure fluid for releasing is supplied to and discharged from the release chamber 11. Supply and discharge passages of pressurized oil for the lock chamber 10 and for the release chamber 11 are not illustrated.

A first detection valve 12 and a second detection valve 13, which are configured to detect the operational state of the piston 5, are respectively provided above a side wall of the housing main body 2 and at a central portion of the lower end wall 3. An air passage 14 and an air passage 15, which communicatively connect the first detection valve 12 and the second detection valve 13 to each other in series, are respectively provided in the side wall of the housing main body 2 and in the lower end wall 3.

An air supply passage 16, through which air (compressed air) functioning as fluid for detection is supplied to the detection valves 12 and 13 in this order, is provided in the side wall of the housing main body 2. An air supply port 16a of the air supply passage 16 is communicatively connected to an air supply passage 17 provided in the stationary stand T. An air discharge passage 18, through which air having been supplied to the detection valves 12 and 13 from the air supply passage 17 is discharged, is provided in the lower end wall 3. An air discharge port 18a of the air discharge passage 18 is communicatively connected to an air discharge passage 19 provided in the stationary stand T.

Figure 4A:
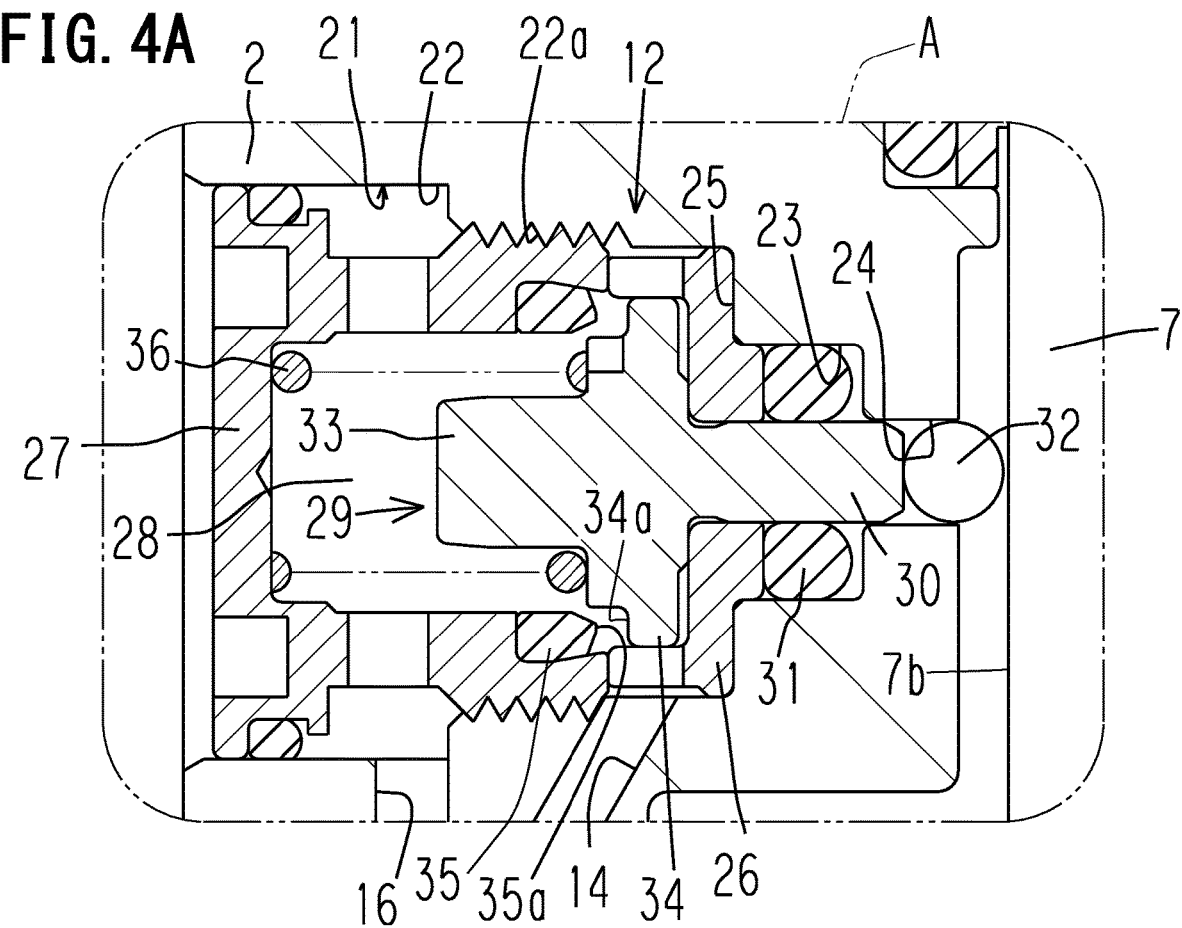
FIG. 4A is an enlarged view of a part A in FIG. 1.
Figure 4B:
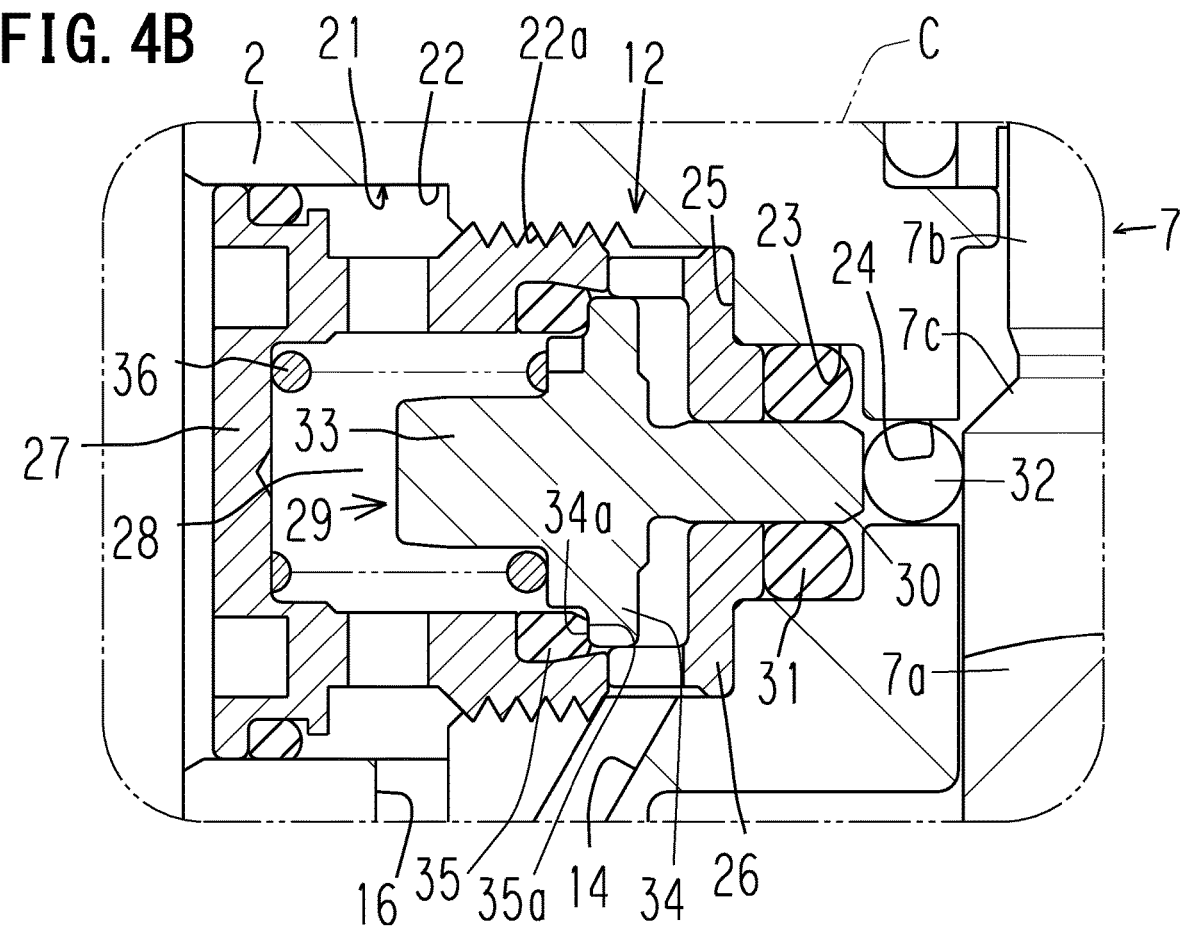
FIG. 4B is an enlarged view of a part C in FIG. 3.

The first detection valve 12 is structured as follows, as shown in FIG. 4A and FIG. 4B.

A first attachment hole 21 is provided laterally above the side wall of the housing main body 2. The first attachment hole 21 includes: a large-diameter hole 22 with an internal thread portion 22a; a middle-diameter hole 23; and a small-diameter hole 24, which are provided in this order from a radially outside of the housing main body 2. An annular pressing member 26 is fixed to a step portion 25 between the internal thread portion 22a and the middle-diameter hole 23 by a first valve case 27 screwed to the internal thread portion 22a. A valve chamber 28 is provided inside the first valve case 27, and the air supply passage 16 is communicatively connected to the valve chamber 28. A first valve element 29 is inserted in the valve chamber 28. A rod portion 30 of the first valve element 29 is movably inserted in the middle-diameter hole 23 via a sealing member 31. An engagement ball 32 functioning as an operation portion configured to push a leading end of the rod portion 30 is inserted in the small-diameter hole 24. The first valve element 29 includes a valve element body 33 having a flange portion 34. A surface of the flange portion 34, which is opposite from the rod portion 30, is a valve surface 34a. An annular sealing member 35 functioning as a valve seat member is fitted inside the first valve case 27. The air passage 14 is communicatively connected to the valve chamber 28. A compression spring 36, functioning as a biasing means and attached between a bottom surface of the first valve case 27 and the valve element body 33, biases the first valve element 29 in a direction in which the valve surface 34a moves away from a valve seat 35a of the sealing member 35.

Figure 5A:
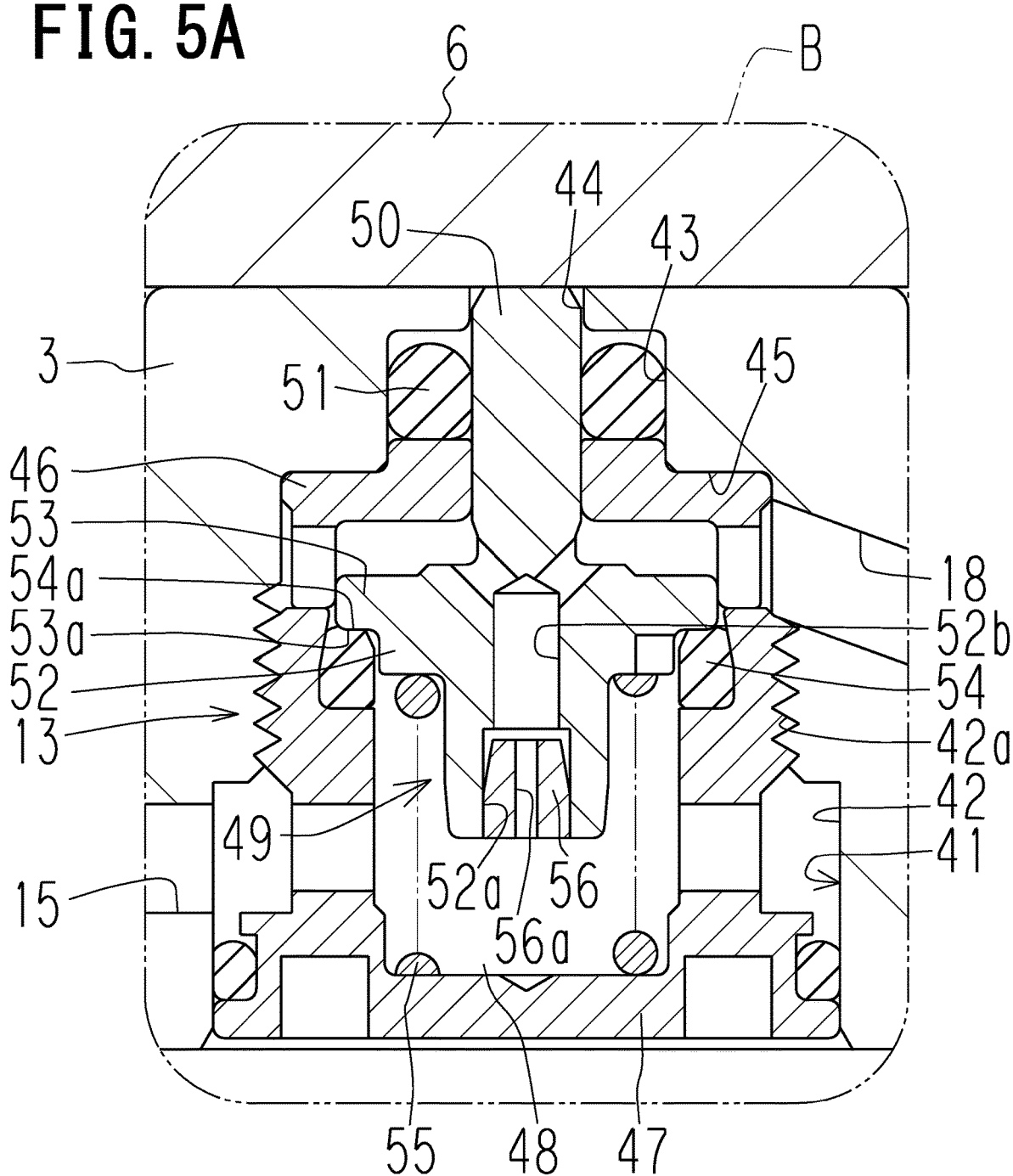
FIG. 5A is an enlarged view of a part B in FIG. 1.
Figure 5B:
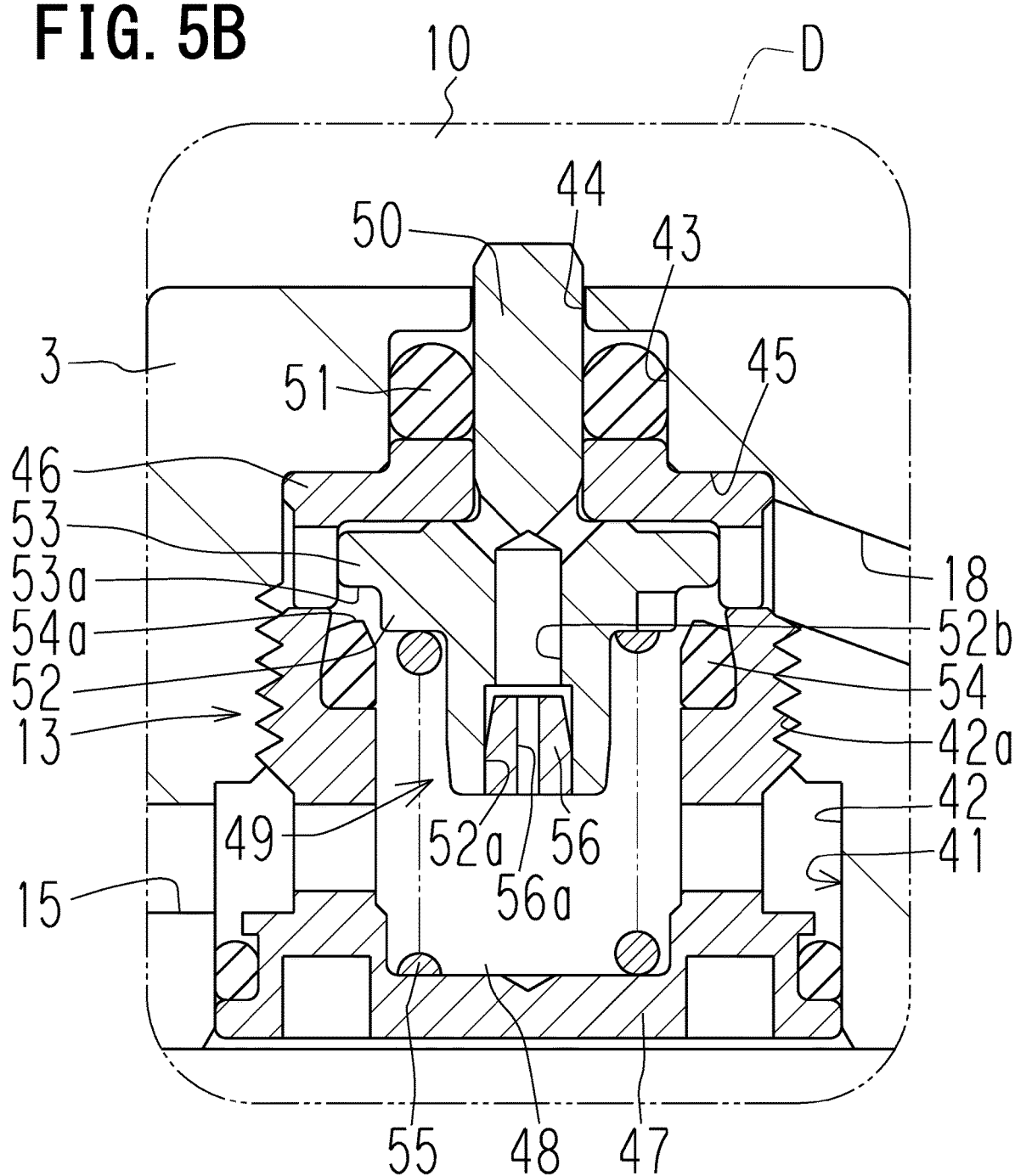
FIG. 5B is an enlarged view of a part D in FIG. 3.

The second detection valve 13 is structured as follows, as shown in FIG. 5A and FIG. 5B.

A second attachment hole 41 is provided in the up-down direction at the central portion of the lower end wall 3 of the housing 1. The second attachment hole 41 includes: a large-diameter hole 42 with an internal thread portion 42a; a middle-diameter hole 43; and a small-diameter hole 44, which are provided in this order from a bottom side of the lower end wall 3. An annular pressing member 46 is fixed to a step portion 45 between the internal thread portion 42a and the middle-diameter hole 43 by a second valve case 47 screwed to the internal thread portion 42a. A valve chamber 48 is provided inside the second valve case 47, and the air passage 15 is communicatively connected to the valve chamber 48. A second valve element 49 is inserted in the valve chamber 48. A rod portion 50 of the second valve element 49 is movably inserted in the middle-diameter hole 43 via a sealing member 51. A leading end portion of the rod portion 50 protrudes into the lock chamber 10. The second valve element 49 includes a valve element body 52 having a flange portion 53. A surface of the flange portion 34, which is opposite from the rod portion 50, is a valve surface 53a. An annular sealing member 54 functioning as a valve seat member is fitted inside the second valve case 47. The air discharge passage 18 is communicatively connected to the valve chamber 48. A compression spring 55, functioning as a biasing means and attached between a bottom surface of the second valve case 47 and the valve element body 52, biases the second valve element 49 in a direction in which the valve surface 53a moves away from a valve seat 54a of the sealing member 54.

Furthermore, the second detection valve 13 is structured as follows to function as a throttle detection valve, which is a detection valve with a throttle. A throttle attachment hole 52a is provided at a central portion of an end portion of the valve element body 52, which is opposite from the rod portion 50. A throttle member 56 is fixed in the attachment hole 52a. A hole 56a functioning as a throttle passage is provided in the throttle member 56. The hole 56a is communicatively connected to a throttle communication passage 52b provided in the valve element body 52. The hole 56a opens to a portion of the valve chamber 48, which is closer to the air passage 15. The communication passage 52b opens to a portion of the valve chamber 48, which is closer to the air discharge passage 18.

The cylinder device having the above-described structure operates as follows.

In a release state shown in FIG. 1, pressurized oil has been discharged from the lock chamber 10 and pressurized oil has been supplied to the release chamber 11. Due to this, the piston 5 has been moved downward by the pressurized oil in the release chamber 11, and a lower end portion of the piston main body 6 is received from below by the lower end wall 3 of the housing 1.

In the release state, the compression spring 36 of the first detection valve 12 has moved the engagement ball 32 toward the output rod 7 via the rod portion 30 of the first valve element 29. Due to this, the valve surface 34a of the first valve element 29 is separated from the valve seat 35a of the sealing member 35, and therefore the first detection valve 12 is open.

Meanwhile, the piston main body 6 of the piston 5 has moved the rod portion 50 of the second valve element 49 downward against the biasing force of the compression spring 55 of the second detection valve 13. Due to this, the valve surface 53a of the second valve element 49 is tightly engaged onto the valve seat 54a of the sealing member 54, and therefore the second detection valve 13 is closed. In this state, because the second detection valve 13 includes the throttle member 56 having the hole 56a functioning as the throttle passage, air leaks through the throttle passage, and therefore air flows through the air supply passage 17, the air supply passage 16, the first detection valve 12, the air passage 14, the air passage 15, the second detection valve 13, the air discharge passage 18, and the air discharge passage 19, in this order. Suppose that the pressure in the air supply passage 17 when the upstream first detection valve 12 is also closed is 0.2 MPa, for example. In the above situation in which: the first detection valve 12 is open; and the second detection valve 13 is closed, the pressure in the air supply passage 17 is lower than 0.2 MPa, and for example, it falls within a range from 0.15 MPa to 0.05 MPa. Such a pressure is detected by a pressure sensor (not shown), and based on this, the operational state of the piston 5 is determined as the release state. The threshold value for the pressure sensor for this determination is set to 0.15 MPa, for example.

Figure 2:
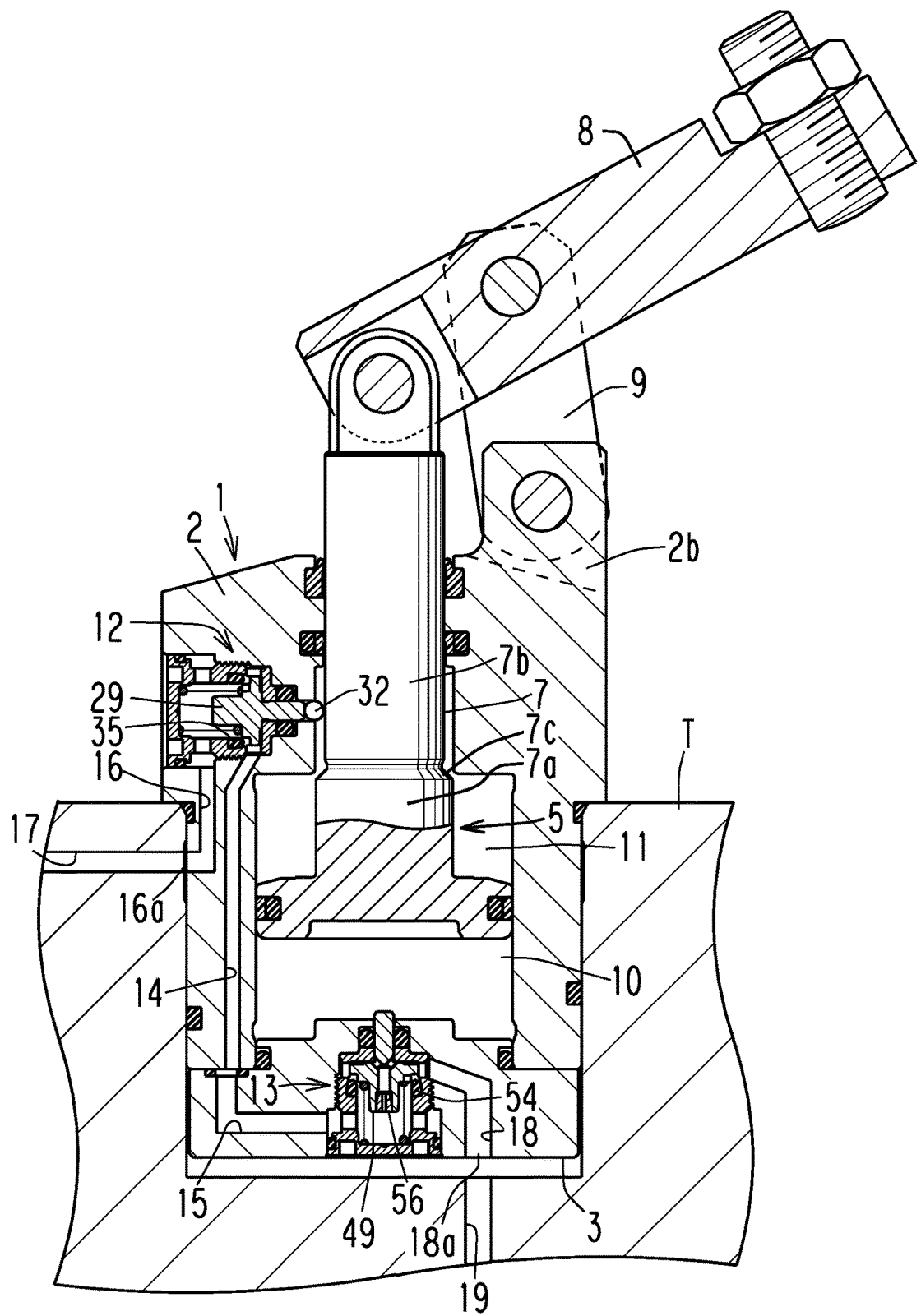
FIG. 2 is an elevational view in section of the cylinder device which is in the course of transition from the release state to a lock state.
Figure 3:
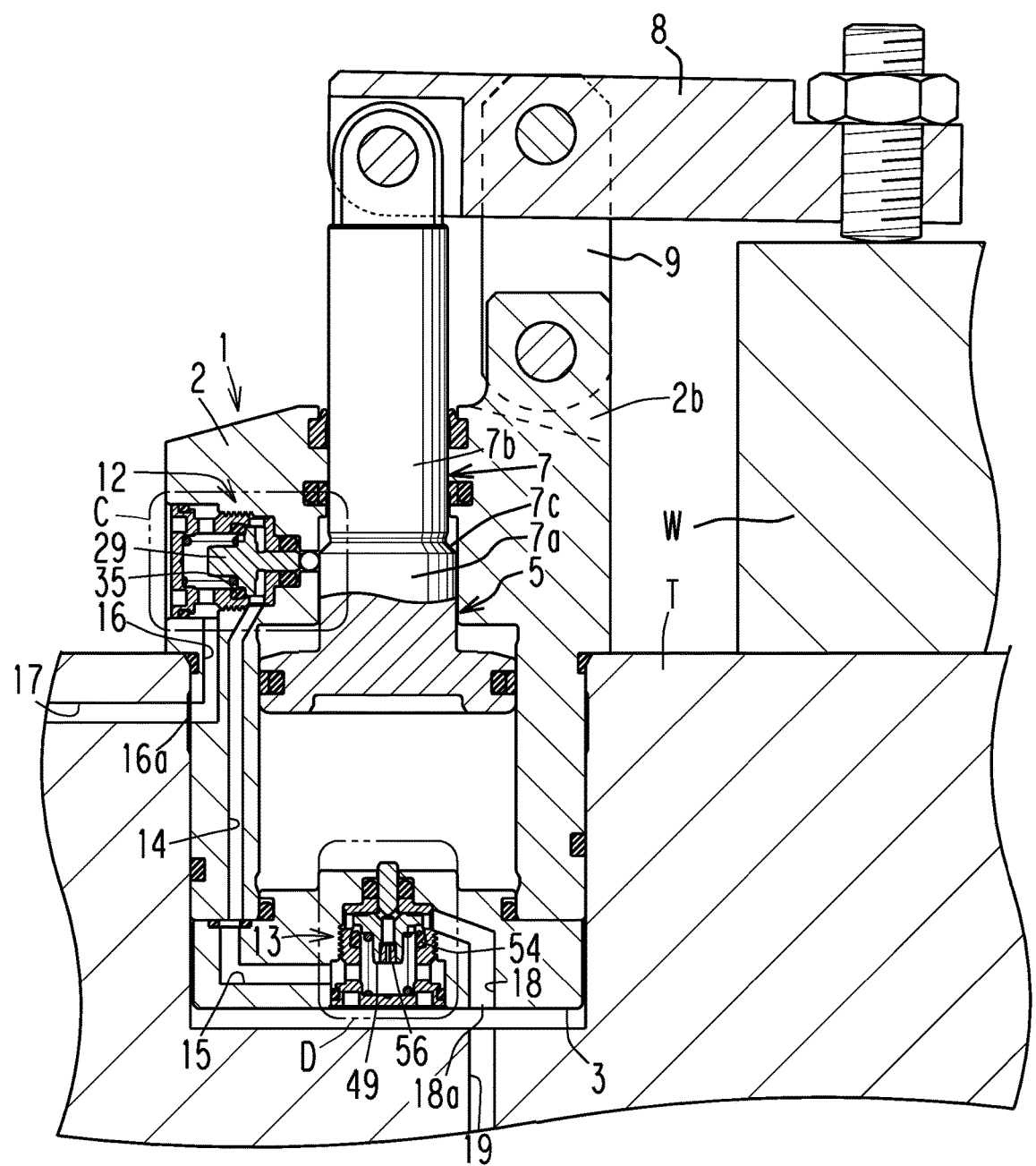
FIG. 3 is an elevational view in section of the cylinder device in the lock state.

To cause the device to transition from the release state shown in FIG. 1 to the lock state shown in FIG. 3, pressurized oil is discharged from the release chamber 11 and pressurized oil is supplied to the lock chamber 10. Then, the piston 5 starts to ascend due to the pressurized oil into the lock chamber 10, and as shown in FIG. 2, the lower end portion of the piston main body 6 is separated from the lower end wall 3 of the housing 1. Consequently, the compression spring 55 of the second detection valve 13 moves the second valve element 49 upward. Due to this, the valve surface 53a of the second valve element 49 is separated from the valve seat 54a of the sealing member 54, to open the second detection valve 13. As a result, the situation in which: the first detection valve 12 is open; and the second detection valve 13 is open, is established. This decreases the pressure in the air supply passage 17, for example, to 0 MPa. Such a pressure is detected by the pressure sensor (not shown), and based on this, the operational state of the piston 5 is determined as a transitional state between the release state and the lock state.

As the piston 5 ascends, a leading end portion of the clamp arm 8 presses a to-be-clamped object W, as shown in FIG. 3. Then the ascent of the piston 5 stops and the device is into the lock state. In this state, a large-diameter portion 7a of the output rod 7 protruding from the piston main body 6 moves the first valve element 29 of the first detection valve 12 leftward via the engagement ball 32. Due to this, the valve surface 34a of the first valve element 29 is tightly engaged onto the valve seat 35a of the sealing member 35, so that the first detection valve 12 is closed. As a result, a situation in which: the first detection valve 12 is closed; and the second detection valve 13 is open is created. Air from the air supply passage 17 is stopped by the first detection valve 12, and therefore the pressure in the air supply passage 17 in this situation is 0.2 MPa, for example. Such a pressure is detected by the pressure sensor (not shown), and based on this, the operational state of the piston 5 is determined as the lock state.

The output rod 7 includes a tapered surface portion 7c between the large-diameter portion 7a and a small-diameter portion 7b, and this allows the first valve element 29 to move leftward smoothly. The pressure values of 0.15 MPa, 0 MPa, and 0.2 MPa mentioned above by way of example are automatically detectable using a single pressure sensor for which a plurality of threshold values can be set.

In the above embodiment, two threshold values (i.e., the first threshold value of 0.15 MPa and the second threshold value of 0.2 MPa) are set for the single pressure sensor to identify the operational state of the piston 5. Instead, two pressure sensors, for each of which one threshold value is set, may be provided to a single passage, to identify the operational state of the piston 5.

Figure 6A:
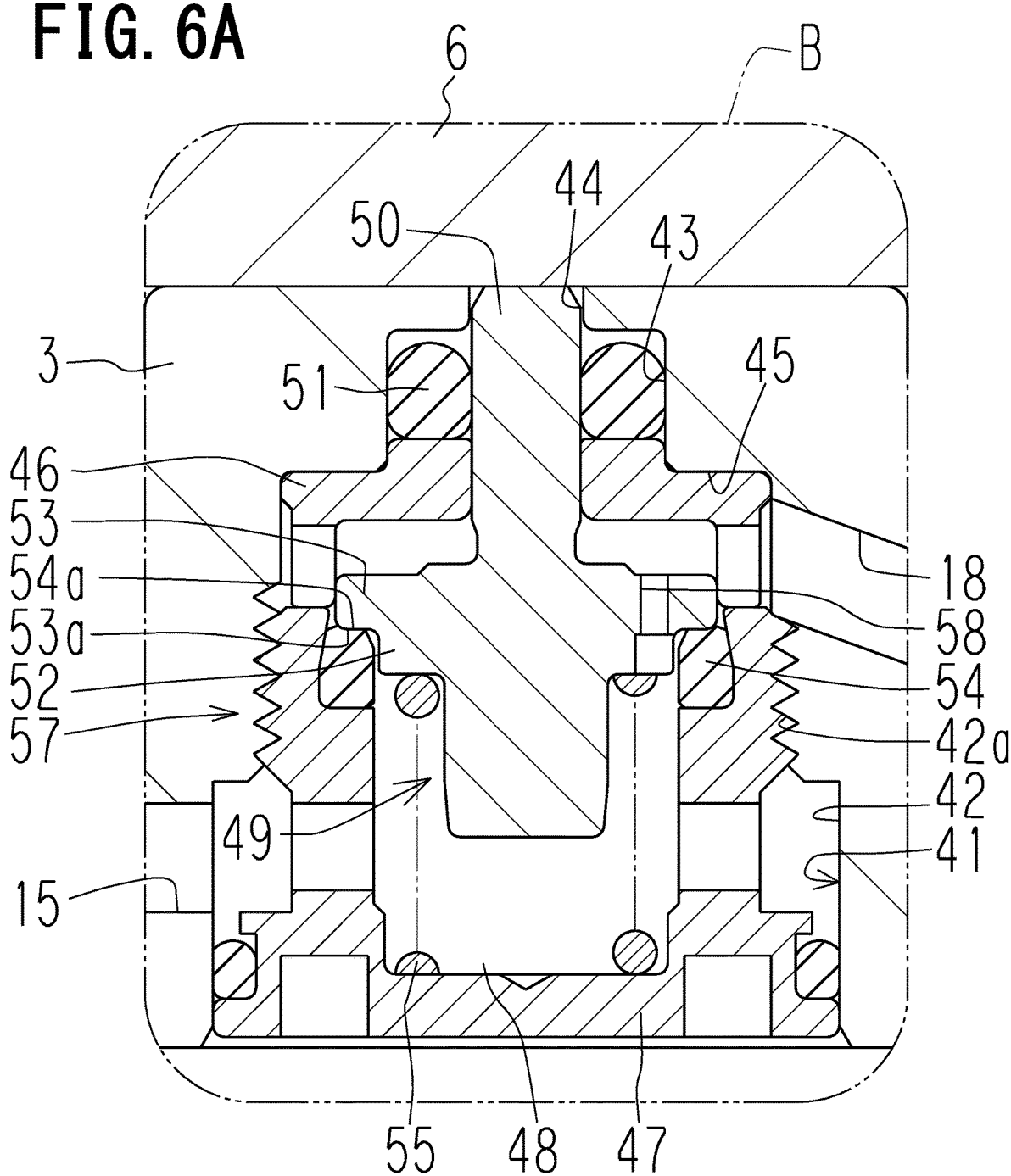
FIG. 6A is a diagram illustrating a modification of a second detection valve (throttle detection valve) and corresponding to FIG. 5A.
Figure 6B:
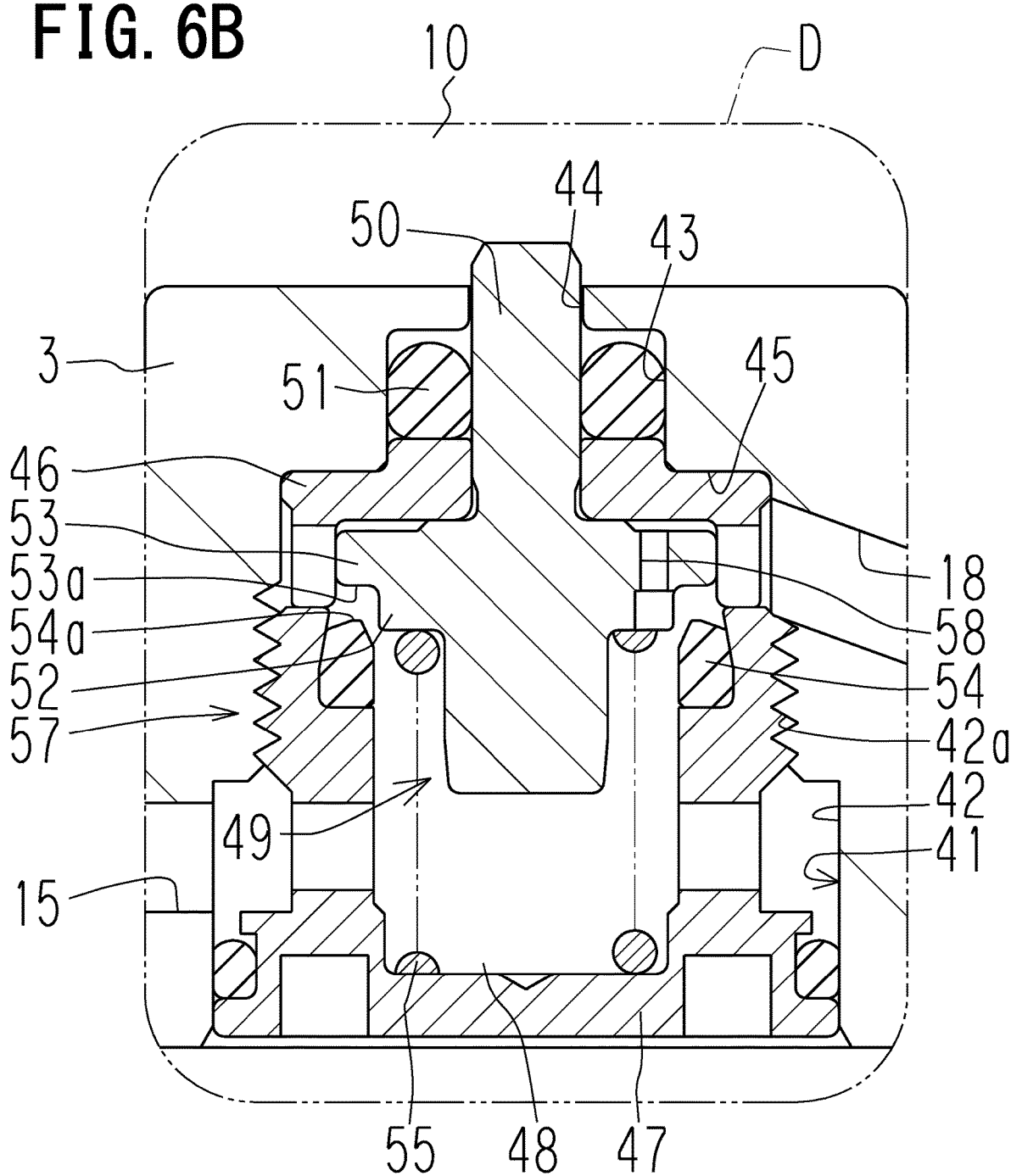
FIG. 6B is a diagram illustrating the modification of the second detection valve (throttle detection valve) and corresponding to FIG. 5B.

FIG. 6A and FIG. 6B show a modification of the second detection valve 13 with the throttle. A second detection valve 57 (throttle detection valve) of this modification is different from the second detection valve 13 in the following points.

Figure 13A:
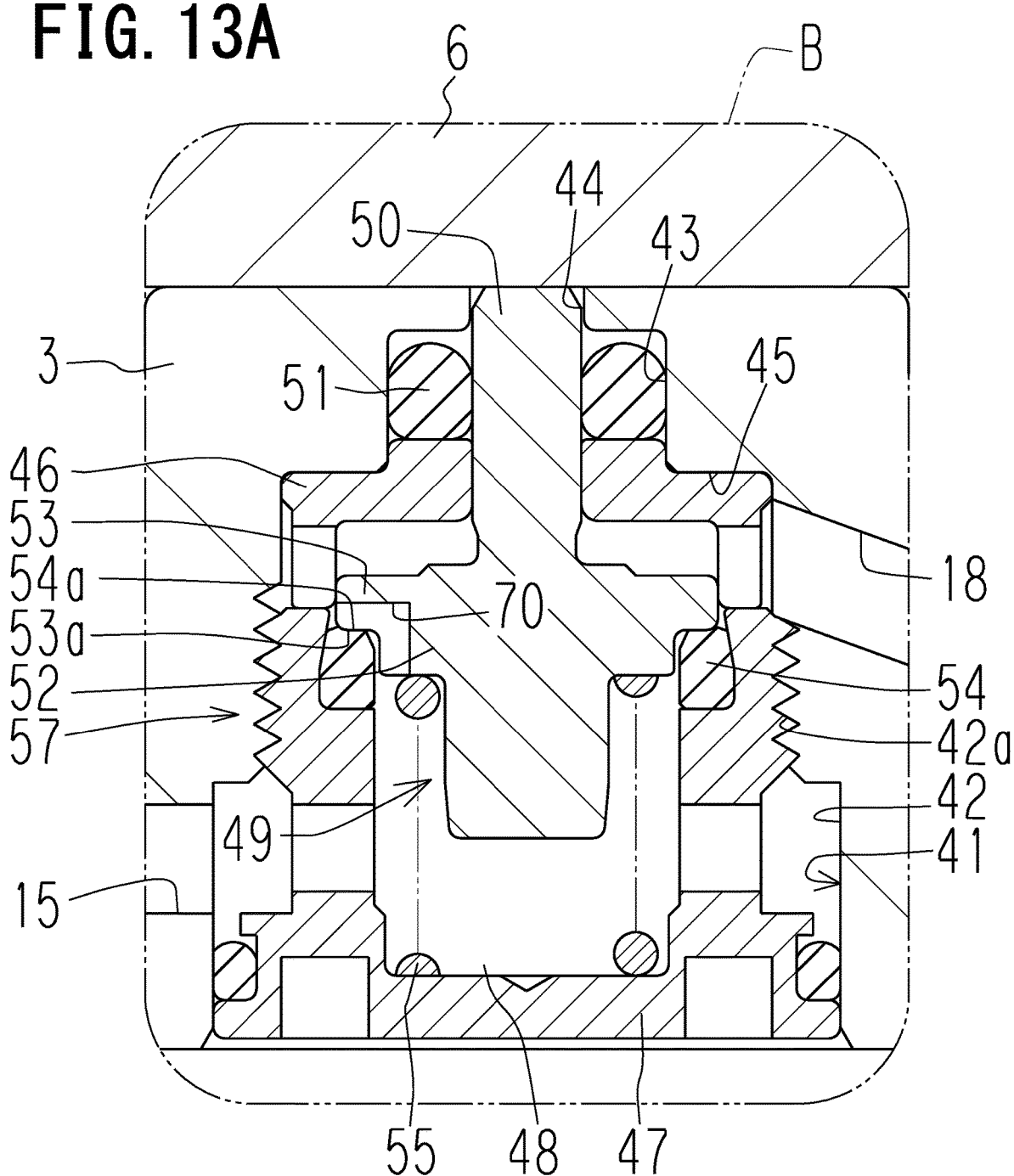
FIG. 13A is a diagram illustrating another modification of the modification of the second detection valve (throttle detection valve) shown in FIGS. 6A and 6B, and corresponding to FIG. 5A.
Figure 13B:
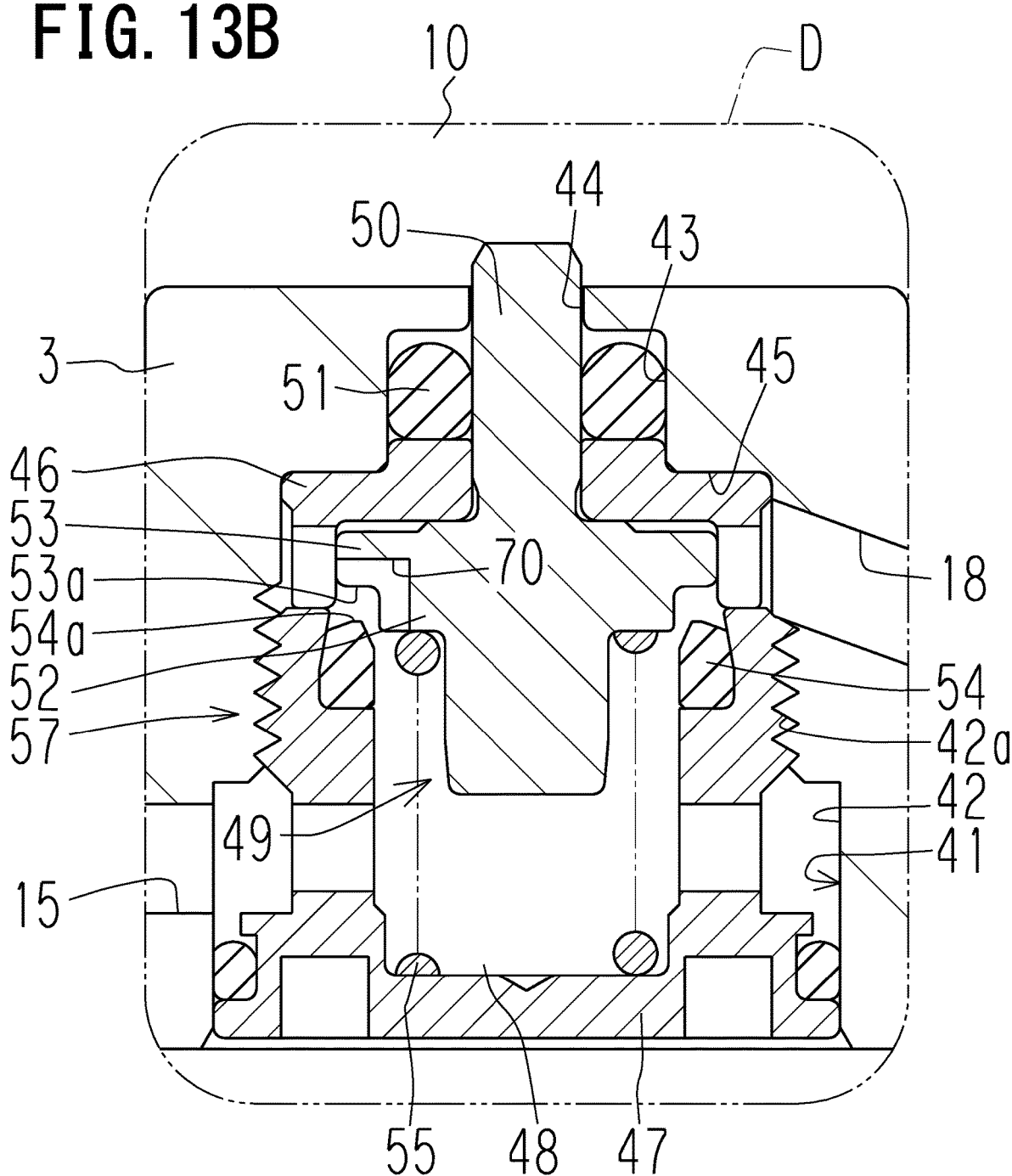
FIG. 13B is a diagram illustrating that another modification of the modification of the second detection valve (throttle detection valve) shown in FIGS. 6A and 6B, and corresponding to FIG. 5A.

In this modification, a hole 58 functioning as the throttle passage is provided so as to pass through the second valve element 49 in the up-down direction. When the valve surface 53a of the second valve element 49 is tightly engaged onto the valve seat 54a of the sealing member 54, the hole 58 acts as a small passage through which a small amount of air flows. The number of such holes 58 provided through the second valve element 49 may be one, or more than one. Alternatively, as shown in FIG. 13A and FIG. 13B, a groove 70 functioning as the throttle passage may be provided on the valve surface 53a of the second valve element 49. Here, similarly to the modification with the one or more holes 58, the number of such grooves 70 provided on the valve surface 53a of the second valve element 49 may be one, or more than one. Furthermore, in the modification shown in FIG. 13A and FIG. 13B, the one or more grooves 70 may be provided on the valve seat 54a, instead of being provided on the valve surface 53a. Similarly to the modification with the one or more grooves 70 provided on the valve surface 53a, the number of the grooves 70 provided on the valve seat 54a may be one, or more than one.

FIG. 7 to FIG. 12 show a second embodiment of the present invention.

A piston 59 structuring a cylinder device of the second embodiment has a rod hole 59a inside thereof, and a rod member 60 is inserted in the rod hole 59a. The piston 59 includes: a piston main body 61; and an output rod 62 extending from the piston main body 61. A compression spring 63 functioning as a biasing means biases the rod member 60 downward. The compression spring 63 is attached between a ceiling surface of the rod hole 59a and a flange portion 60a provided at an intermediate portion of the rod member 60. An annular member 86 functioning as an operation portion for the rod member 60 is fitted in a lower end portion of the rod hole 59a.

A first detection valve 64 and a second detection valve 65, which are configured to detect the operational state of the piston 59, are provided in the lower end wall 3 structuring the housing 1 (in a lower end portion of the housing 1). An air passage 66 that communicatively connects the first detection valve 64 and the second detection valve 65 to each other in series is provided in the lower end wall 3.

Air supply passages 67 and 68, through which air (compressed air) functioning as fluid for detection is supplied to the first detection valve 64 and to the second detection valve 65 in this order, are provided in a lower portion of the side wall of the housing main body 2 and in the lower end wall 3, respectively. An air supply port 67a of the air supply passage 67 is communicatively connected to the air supply passage 17 provided in the stationary stand T. An air discharge passage 69, through which air having been supplied to the detection valves 64 and 65 from the air supply passages 67 and 68 is discharged, is provided in the lower end wall 3. An air discharge port 69a of the air discharge passage 69 is communicatively connected to the air discharge passage 19 provided in the stationary stand T.

Figure 10:
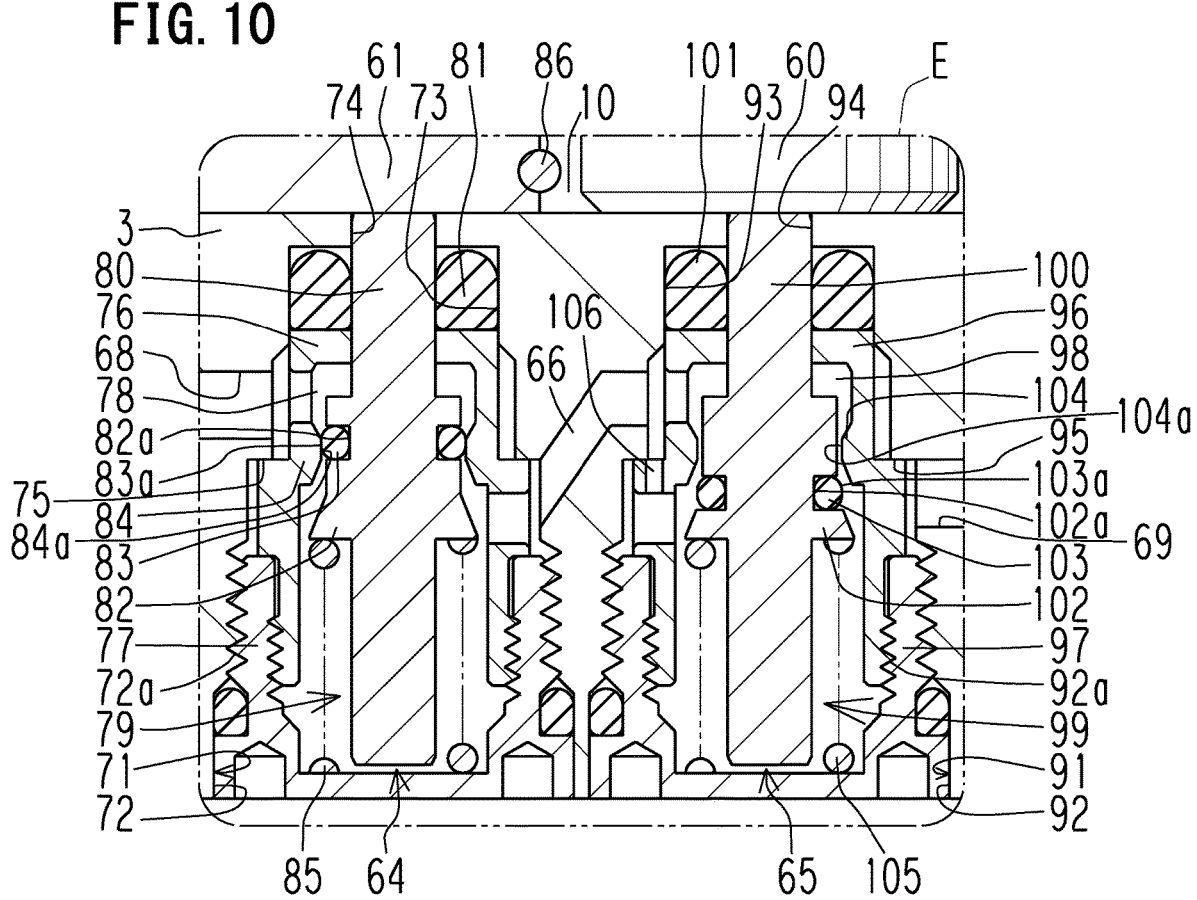
FIG. 10 is an enlarged view of a part E in FIG. 7.
Figure 11:
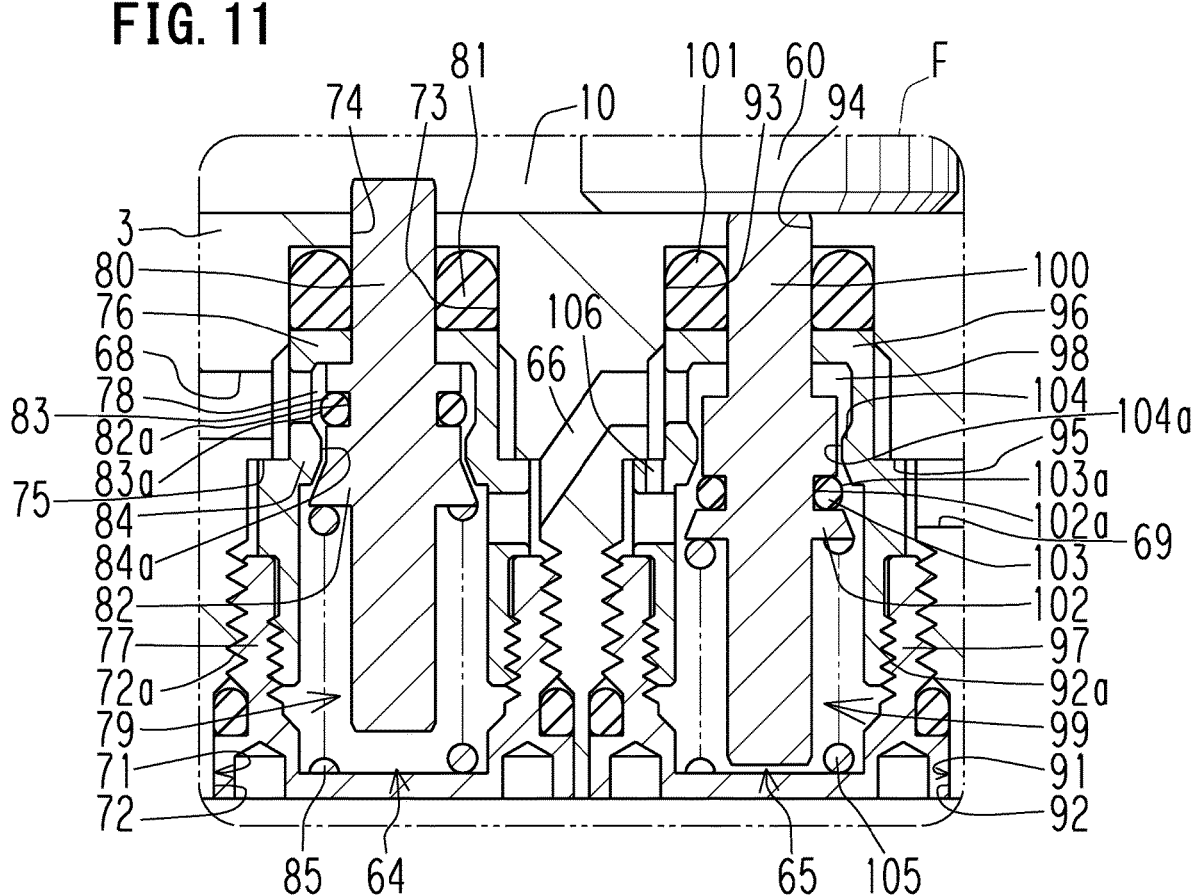
FIG. 11 is an enlarged view of a part F in FIG. 8.
Figure 12:
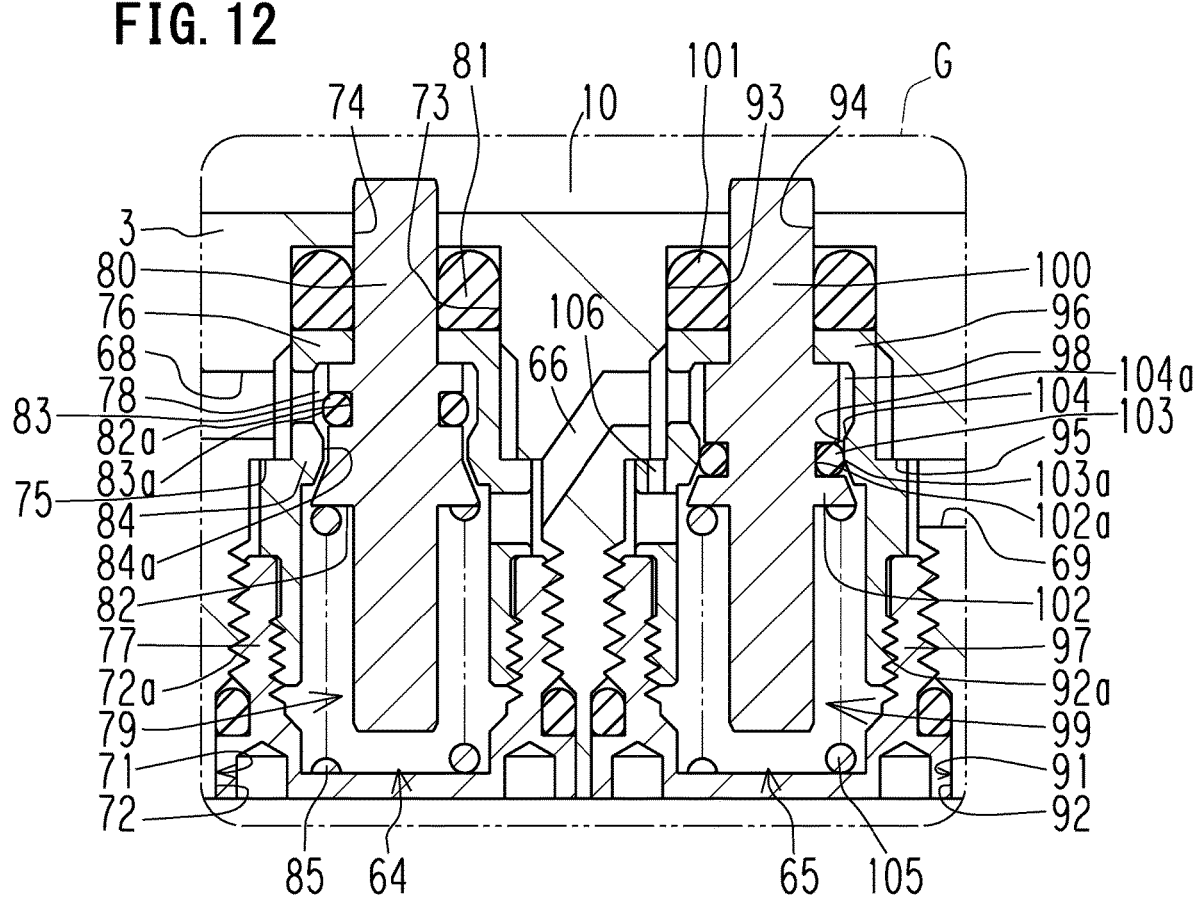
FIG. 12 is an enlarged view of a part G in FIG. 9.

The first detection valve 64 is structured as follows, as shown in FIG. 10 to FIG. 12.

A first attachment hole 71 is provided in the lower end wall 3 so as to extend in the up-down direction. The first attachment hole 71 includes: a large-diameter hole 72 with an internal thread portion 72a; a middle-diameter hole 73; and a small-diameter hole 74, which are provided in this order from the bottom side of the lower end wall 3. A tubular pressing member 76 is screwed to a first valve case 77. The tubular pressing member 76 is fixed to a step portion 75 between the internal thread portion 72a and the middle-diameter hole 73 by the first valve case 77 screwed to the internal thread portion 72a. A valve chamber 78 is provided inside the first valve case 77 and inside the tubular pressing member 76. The air supply passage 68 is communicatively connected to the valve chamber 78. A first valve element 79 is inserted in the valve chamber 78. A rod portion 80 of the first valve element 79 is movably inserted in the middle-diameter hole 73 via a sealing member 81. As shown in FIG. 11 and FIG. 12, a leading end portion of the rod portion 80 protrudes into the lock chamber 10. An outer peripheral surface of an O-ring 83 fitted in an outer peripheral groove 82a of a valve element body 82 of the first valve element 79 is a valve surface 83a. A protruding portion 84 functioning as a valve seat portion is provided on an inner peripheral wall of the tubular pressing member 76. Furthermore, the air passage 66 is communicatively connected to the valve chamber 78. A compression spring 85, functioning as a biasing means and attached between a bottom surface of the first valve case 77 and the valve element body 82, biases the first valve element 79 in a direction in which the valve surface 83a moves away from a valve seat 84a of the protruding portion 84.

The second detection valve 65 is structured as follows, as shown in FIG. 10 and FIG. 12.

A second attachment hole 91 is provided in the lower end wall 3 so as to extend in the up-down direction. The second attachment hole 91 includes: a large-diameter hole 92 with an internal thread portion 92a; a middle-diameter hole 93; and a small-diameter hole 94, which are provided in this order from the bottom side of the lower end wall 3. A tubular pressing member 96 is screwed to a second valve case 97. The tubular pressing member 96 is fixed to a step portion 95 between the internal thread portion 92a and the middle-diameter hole 93 by the second valve case 97 screwed to the internal thread portion 92a. A valve chamber 98 is provided inside the second valve case 97 and inside the tubular pressing member 96. The air passage 66 is communicatively connected to the valve chamber 98. A second valve element 99 is inserted in the valve chamber 98. A rod portion 100 of the second valve element 99 is movably inserted in the middle-diameter hole 93 via a sealing member 101. As shown in FIG. 12, a leading end portion of the rod portion 100 protrudes into the lock chamber 10. An outer peripheral surface of an O-ring 103 fitted in an outer peripheral groove 102a of a valve element body 102 of the second valve element 99 is a valve surface 103a. A protruding portion 104 functioning as a valve seat portion is provided on an inner peripheral wall of the tubular pressing member 96. The air discharge passage 69 is communicatively connected to the valve chamber 98. A compression spring 105, functioning as a biasing means and attached between a bottom surface of the second valve case 97 and the valve element body 102, biases the second valve element 99 in a direction in which the valve surface 103a moves toward a valve seat 104a of the protruding portion 104.

Furthermore, the second detection valve 65 is structured as follows, to function as a throttle detection valve. A throttle passage 106 communicatively connecting the air passage 66 to the valve chamber 98 is provided in a portion of the tubular pressing member 96, which is on a back side relative to the protruding portion 104.

The cylinder device having the above-described structure operates as follows.

Figure 7:
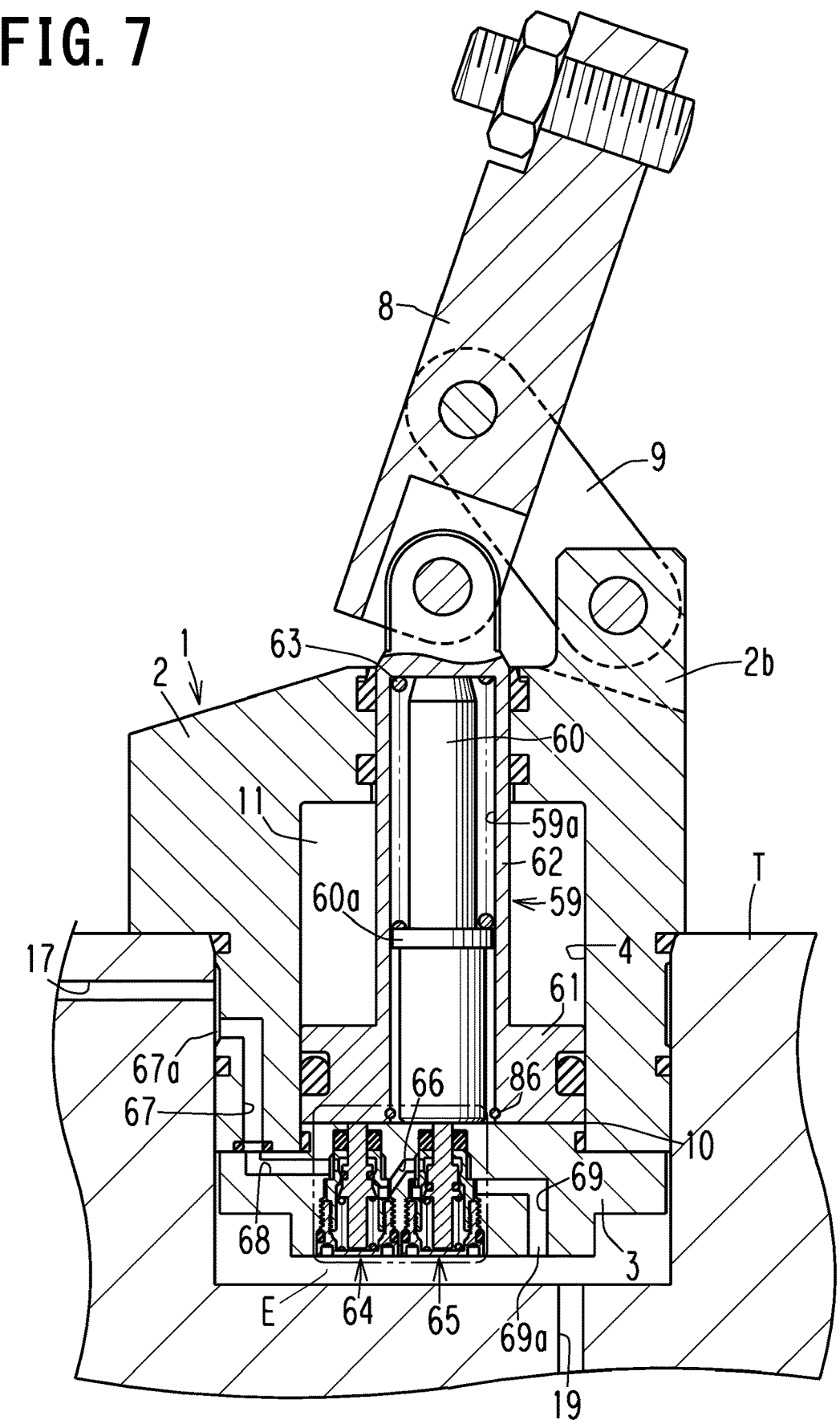
FIG. 7 shows a second embodiment of the present invention, and is an elevational view in section of a cylinder device in the release state.

In the release state shown in FIG. 7, pressurized oil has been discharged from the lock chamber 10 and pressurized oil has been supplied to the release chamber 11. Due to this, the piston 59 has been moved downward by the pressurized oil in the release chamber 11, and a lower end portion of the piston main body 61 is received from below by the lower end wall 3 of the housing 1. Furthermore, the rod member 60 inside the piston 59 is pressed onto the lower end wall 3 due to the biasing force of the compression spring 63.

In the release state, the piston main body 61 of the piston 59 has moved the rod portion 80 of the first valve element 79 downward against the biasing force of the compression spring 85 of the first detection valve 64. Due to this, the valve surface 83a of the O-ring 83 structuring the first valve element 79 is tightly engaged onto the valve seat 84a of the protruding portion 84 of the tubular pressing member 76, so that the first detection valve 64 is closed. Meanwhile, the rod member 60 has moved the rod portion 100 of the second valve element 99 downward against the biasing force of the compression spring 105 of the second detection valve 65. Due to this, the valve surface 103a of the O-ring 103 structuring the second valve element 99 is separated from the valve seat 104a of the protruding portion 104 of the tubular pressing member 96, so that the second detection valve 65 is open.

Because the first detection valve 64 is closed, air supplied from the air supply passage 17 is stopped by the first detection valve 64, and therefore the pressure in the air supply passage 17 in this situation is 0.2 MPa, for example. Such a pressure is detected by a pressure sensor (not shown), and based on this, the operational state of the piston 59 is determined as the release state.

Figure 8:
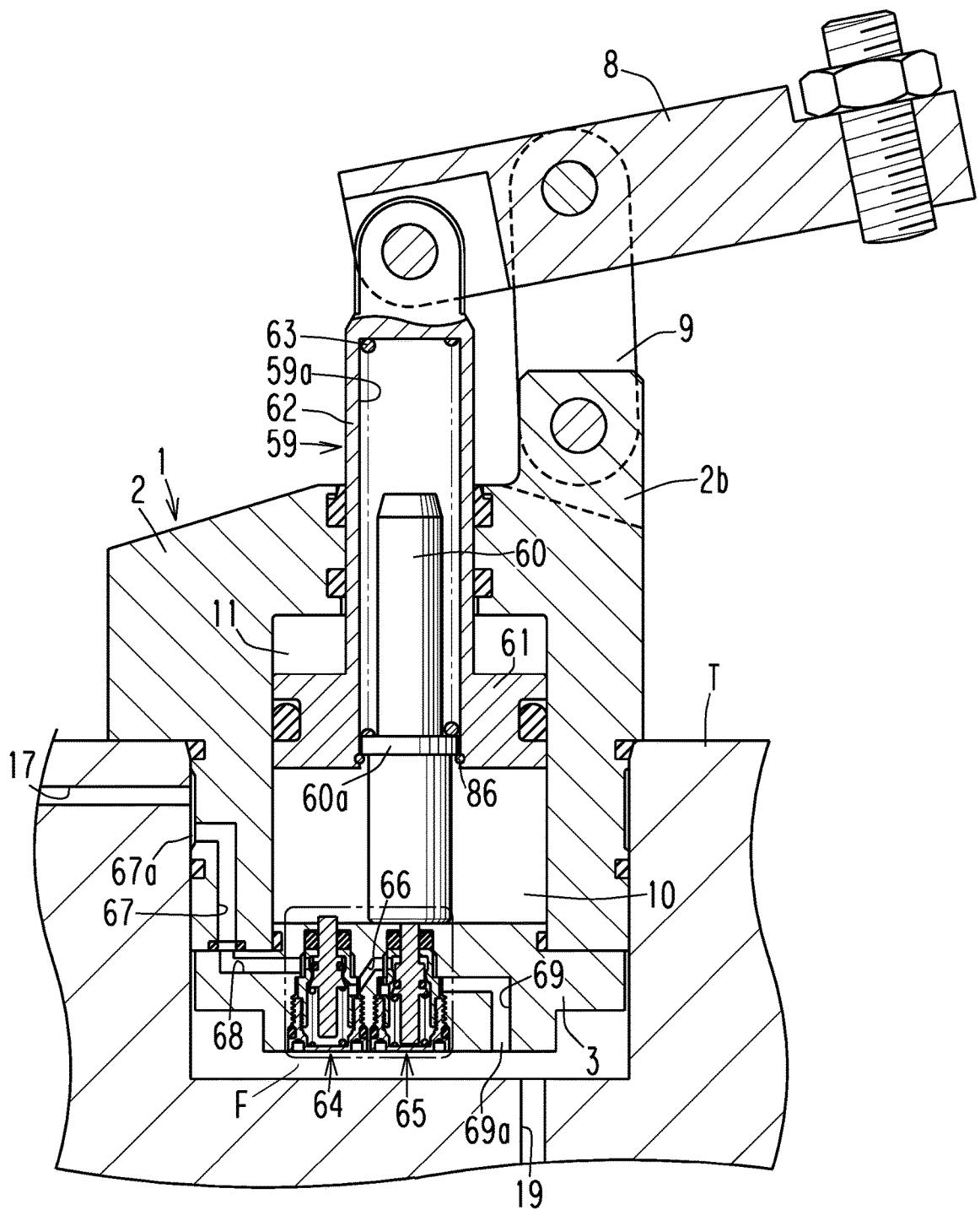
FIG. 8 is an elevational view in section of the cylinder device which is in the course of transition from the release state to the lock state.
Figure 9:
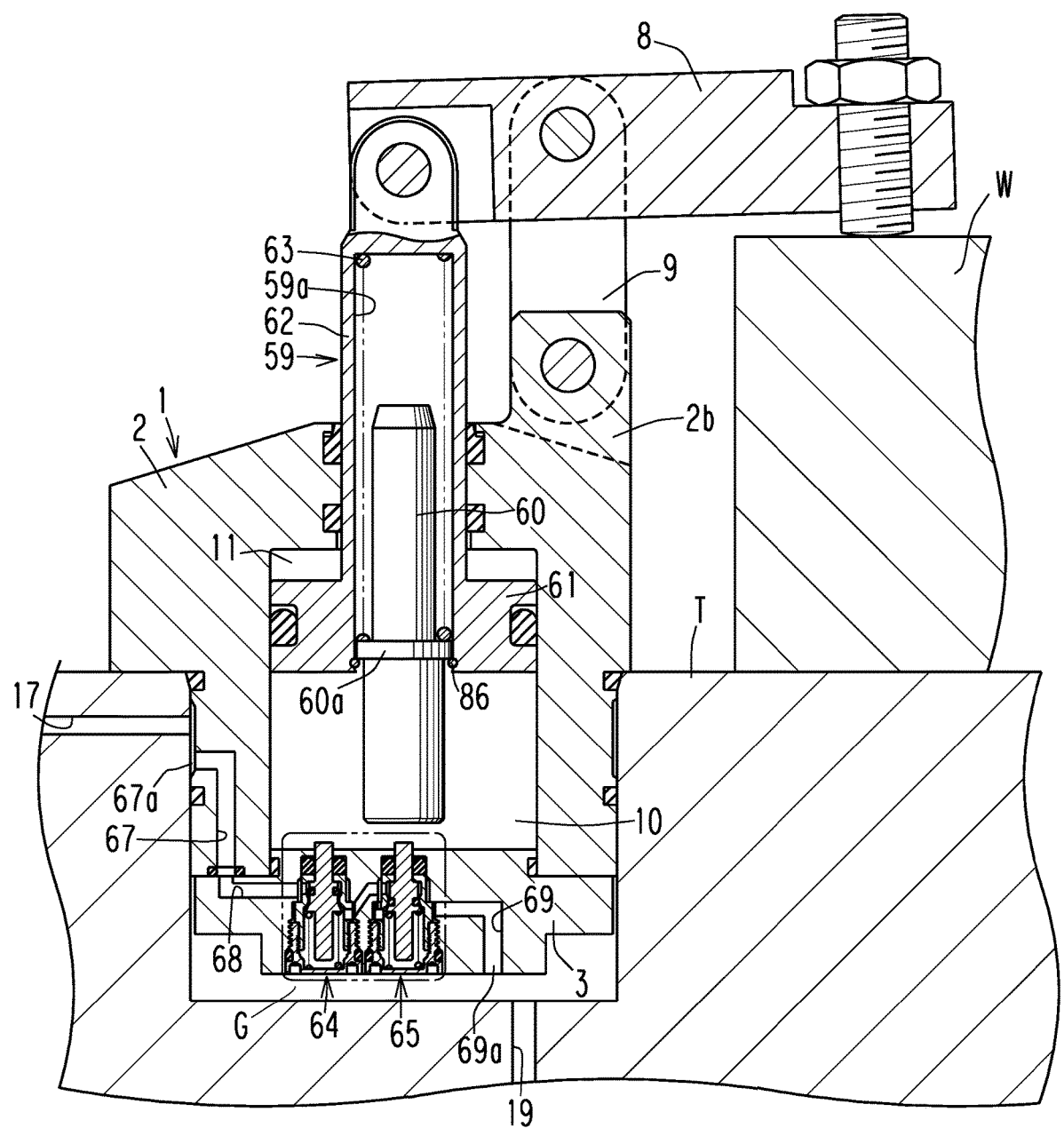
FIG. 9 is an elevational view in section of the cylinder device in the lock state.

To cause the device to transition from the release state shown in FIG. 7 to the lock state shown in FIG. 9, pressurized oil is discharged from the release chamber 11 and pressurized oil is supplied to the lock chamber 10. Then, the piston 59 starts to ascend due to the pressurized oil into the lock chamber 10, and as shown in FIG. 8, the lower end portion of the piston main body 61 is separated from the lower end wall 3 of the housing 1. Consequently, the compression spring 85 of the first detection valve 64 moves the first valve element 79 upward. Due to this, the valve surface 83a of the O-ring 83 structuring the first valve element 79 is separated from the valve seat 84a, to open the first detection valve 64. Meanwhile, the rod member 60 inside the piston 59 is still pressed onto the lower end wall 3 by the biasing force of the compression spring 63, and therefore the second detection valve 65 is open. As a result, the situation in which: the first detection valve 64 is open; and the second detection valve 65 is open, is established.

This decreases the pressure in the air supply passage 17, for example, to 0 MPa. Such a pressure is detected by the pressure sensor (not shown), and based on this, the operational state of the piston 59 is determined as the transitional state between the release state and the lock state.

As the piston 59 ascends, the annular member 86 fitted in the lower end portion of the rod hole 59a of the piston main body 61 comes into contact, from below, with an under surface of the flange portion 60a provided at the intermediate portion of the rod member 60, as shown in FIG. 8. As the piston 59 ascends further, the leading end portion of the clamp arm 8 presses a to-be-clamped object W, as shown in FIG. 9. Then the ascent of the piston 59 stops and the device is into the lock state. In this state, the piston main body 61 has moved the rod member 60 upward via the annular member 86 against the biasing force of the compression spring 63. Due to this, the compression spring 105 of the second detection valve 65 moves the second valve element 99 upward, and this causes the valve surface 103a of the O-ring 103 structuring the second valve element 99 to be tightly engaged onto the valve seat 104a, to close the second detection valve 65. Because the second detection valve 65 has the throttle passage 106, a small amount of air flows through the air supply passage 17, the air supply passage 67, the air supply passage 68, the first detection valve 64, the air passage 66, the second detection valve 65, the air discharge passage 69, and the air discharge passage 19, in this order. The pressure in the air supply passage 17 in this situation is lower than 0.2 MPa, for example, is 0.15 MPa. Such a pressure is detected by the pressure sensor (not shown), and based on this, the operational state of the piston 59 is determined as the lock state.

The pressure values of 0.2 MPa, 0 MPa, and 0.15 MPa mentioned above by way of example are automatically detectable using a single pressure sensor for which a plurality of threshold values can be set.

FIG. 15 to FIG. 19B show a third embodiment of the present invention.

This embodiment deals with a case in which the cylinder device of the present invention is applied to a rotary clamp, by way of example. A piston 150 inserted in the housing 1 structuring the cylinder device of the third embodiment has a rod hole 150a in its lower portion. A rod member 113 is inserted in the rod hole 150a. The piston 150 includes: a piston main body 151; and an output rod 108 hermetically inserted in and fixed to a tubular hole 151a of the piston main body 151. A compression spring 114 functioning as a biasing means biases the rod member 113 downward. The compression spring 114 is attached between a ceiling surface of the rod hole 150a and a flange portion 113a provided at an intermediate portion of the rod member 113. The rod member 113 is configured to be lifted via an annular member 115 fitted in a lower end portion of the rod hole 150a.

A clamp arm 109 is fixed to a leading-end-side portion of the output rod 108 with a nut 110. A lower end portion of the output rod 108 is inserted in a support hole 3a provided in the lower end wall 3 of the housing 1. Pressurized oil functioning as pressure fluid for locking is supplied to and discharged from a lock chamber 111, provided above the piston main body 151, through a lock passage 111a. Furthermore, pressurized oil functioning as pressure fluid for releasing is supplied to and discharged from a release chamber 112, provided between the piston main body 151 and the lower end wall 3, through a release passage 112a.

An output rod rotating mechanism 116 is provided at a portion of the output rod 108, which is on a base end side relative to a flange portion 108a. That is, the output rod rotating mechanism 116 is provided at the lower end portion of the output rod 108. The output rod rotating mechanism 116 is structured as follows.

At least one guide groove 117 provided on an outer wall of the output rod 108 includes a straight linear groove 117a and a spiral rotation groove 117b that are provided continuously so that the linear groove 117a is above the rotation groove 117b. At least one lateral hole 118 is provided at an upper portion of a peripheral wall of the support hole 3a. An engagement ball 119 inserted in the lateral hole 118 is fitted in the guide groove 117. A sleeve 120 is rotatably fitted over an outer periphery of the engagement ball 119.

A first detection valve 121 and a second detection valve 122, which are configured to detect the operational state of the piston 150, are respectively provided above the side wall of the housing main body 2 and in the lower end wall 3. Air (compressed air) functioning as fluid for detection and supplied from a compressed air supply source passes through air passages 123 to 128 and then is discharged to an outside of the housing 1 (to the outside).

Figure 18A:
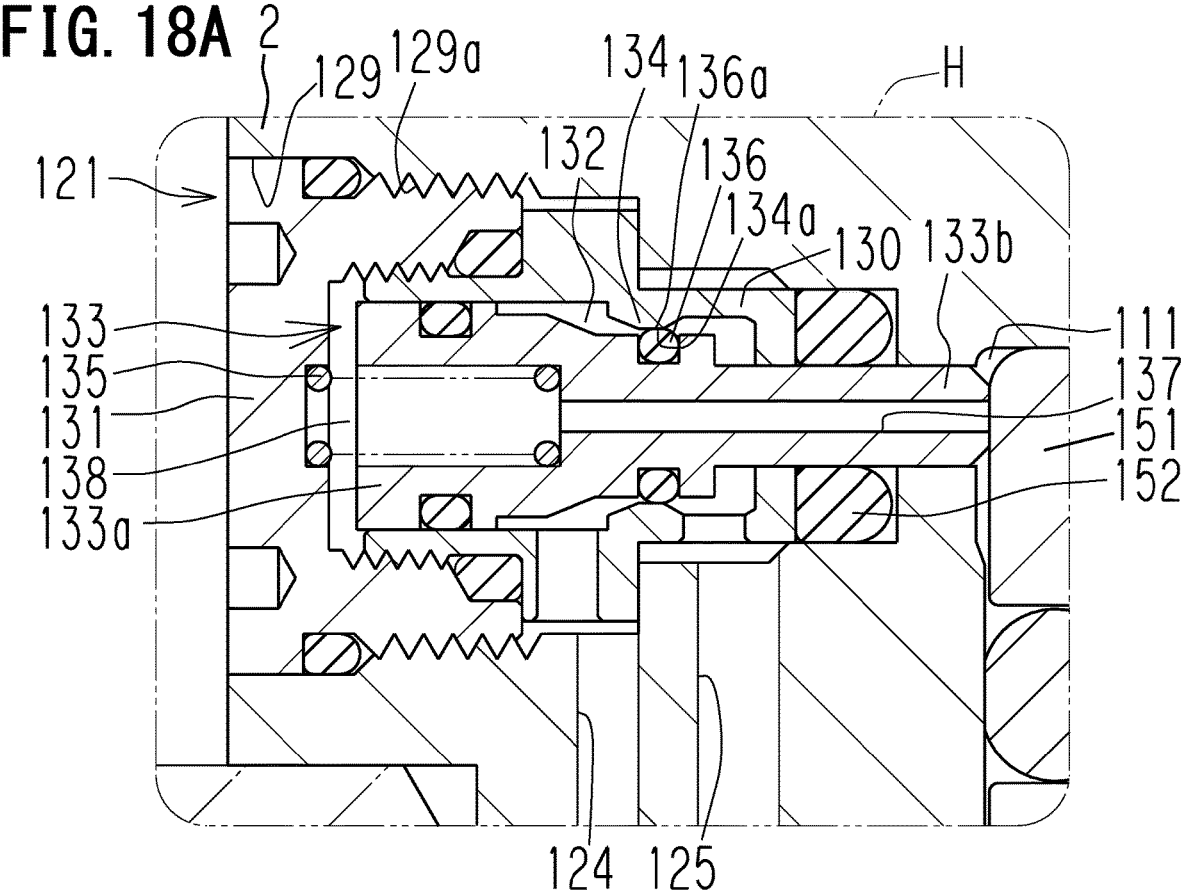
FIG. 18A is an enlarged view of a part H in FIG. 15.
Figure 18B:
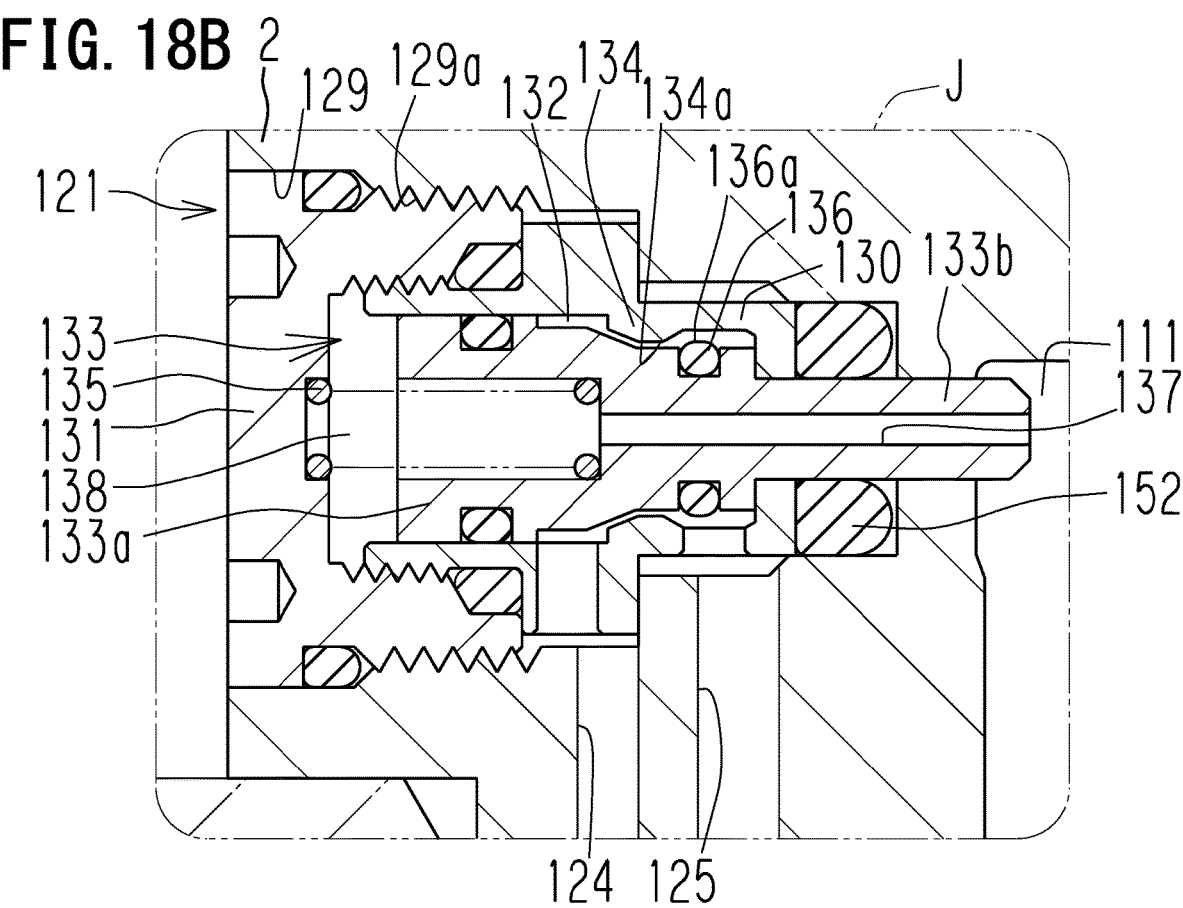
FIG. 18B is an enlarged view of a part J in FIG. 17.

The first detection valve 121 shown in FIG. 18A and FIG. 18B is similar to the first detection valve 64 shown in FIG. 10 to FIG. 12. The first detection valve 121 is structured as follows.

A tubular pressing member 130 is fixed to a first attachment hole 129 by a first valve case 131, which is screwed to an internal thread portion 129a of the first attachment hole 129 provided in the housing main body 2 so as to extend in a left-right direction. A valve element body 133a of a first valve element 133 is hermetically inserted in a valve chamber 132 provided inside the first valve case 131 and inside the tubular pressing member 130. The air passage 124 and the air passage 125 are communicatively connected to the valve chamber 132. A rod portion 133b is provided to protrude rightward from the valve element body 133a, and a leading end portion of the rod portion 133b protrudes into the lock chamber 111. The valve chamber 132 and the lock chamber 111 are separated from each other by a sealing member 152. A compression spring 135 is attached between the first valve case 131 and a bottom surface of an attachment hole provided at a left portion of the first valve element 133. The compression spring 135 biases the first valve element 133 in a direction in which a valve surface 136a of a sealing member 136 moves away from a valve seat 134a of a protruding portion 134 of the tubular pressing member 130.

Furthermore, a communication passage 137 is provided in the first valve element 133. The communication passage 137 communicatively connects the lock chamber 111 to a first hydraulic chamber 138 provided to the left of the first valve element 133. This allows pressurized oil supplied to the lock chamber 111 to be supplied to the first hydraulic chamber 138 through the communication passage 137. Here, a pressure receiving area of the valve element body 133a (the area of a section of the valve element body 133a, which is orthogonal to its axis) is designed to be larger than a pressure receiving area of the rod portion 133b (the area of a section of the rod portion 133b, which is orthogonal to its axis). Because of this, the first valve element 133 is moved so as to protrude into the lock chamber 111 by the force of the difference between: a force of the pressurized oil in the lock chamber 111 pushing the first valve element 133 leftward; and a force of the pressurized oil in the first hydraulic chamber 138 pushing the first valve element 133 rightward.

Figure 19A:
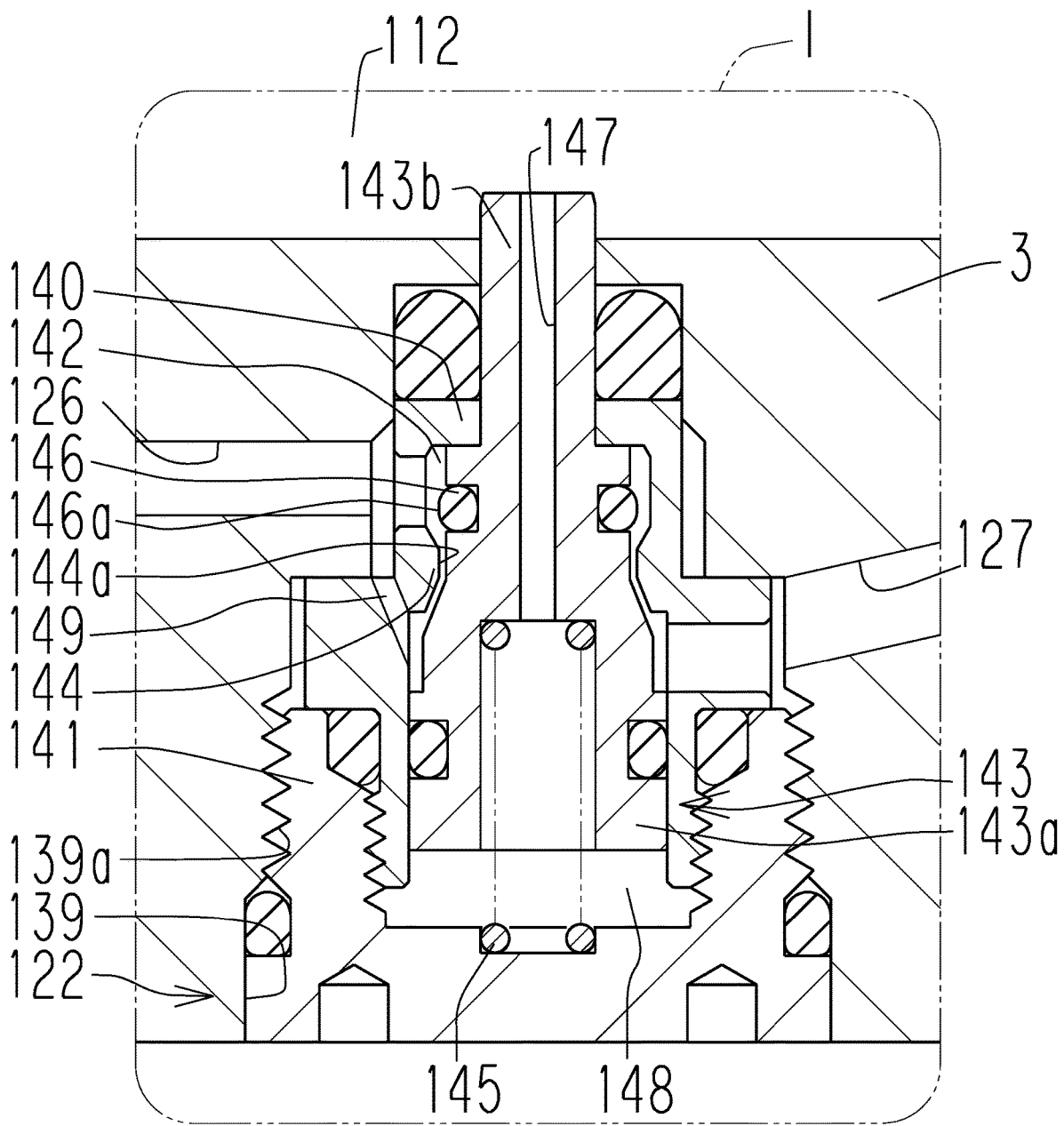
FIG. 19A is an enlarged view of a part I in FIG. 15.
Figure 19B:
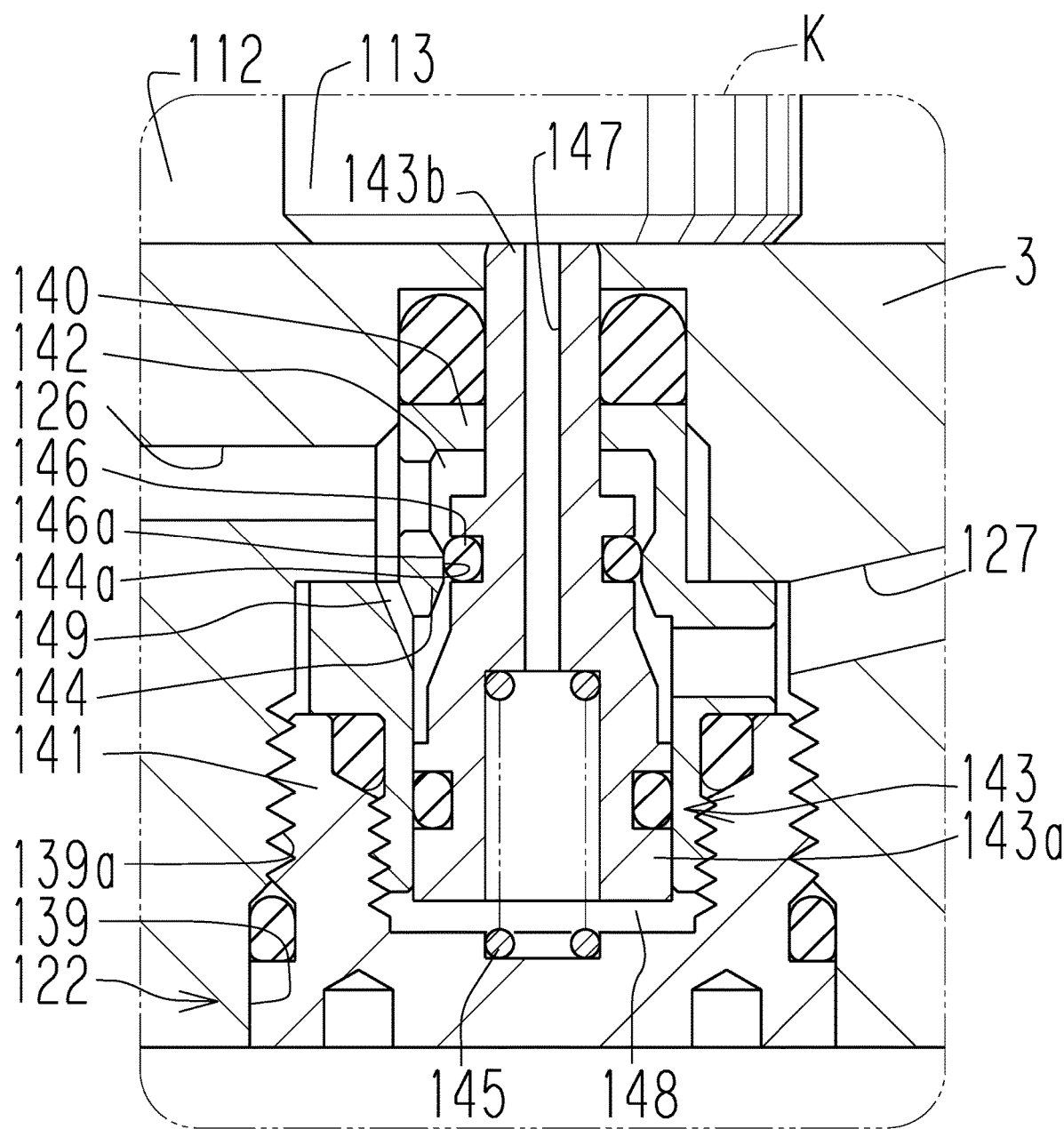
FIG. 19B is an enlarged view of a part K in FIG. 17.

The second detection valve 122 shown in FIG. 19A and FIG. 19B is similar to the second detection valve 65 shown in FIG. 10 to FIG. 12. The second detection valve 122 is structured as follows.

A tubular pressing member 140 is fixed to a second attachment hole 139 by a second valve case 141, which is screwed to an internal thread portion 139a of the second attachment hole 139 provided in the lower end wall 3 of the housing 1 so as to extend in the up-down direction. The air passage 126 and the air discharge passage 127 are communicatively connected to a valve chamber 142 in the second detection valve 122. A valve element body 143a of a second valve element 143 is hermetically inserted in the valve chamber 142. A leading end portion of a rod portion 143b, provided to protrude upward from the valve element body 143a, protrudes into the release chamber 112. A compression spring 145 is attached between a bottom surface of the second valve case 141 and an attachment hole provided in the valve element body 143a. The compression spring 145 biases the second valve element 143 in a direction in which a valve surface 146a of a sealing member 146 is separated from a valve seat 144a of a protruding portion 144 of the tubular pressing member 140.

Furthermore, a communication passage 147 provided in the second valve element 143 communicatively connects the release chamber 112 to a second hydraulic chamber 148 provided below the second valve element 143. This allows pressurized oil supplied to the release chamber 112 to be supplied to the second hydraulic chamber 148 through the communication passage 147. Here, a pressure receiving area of the valve element body 143a (the area of a section of the valve element body 143a, which is orthogonal to its axis) is designed to be larger than a pressure receiving area of the rod portion 143b (the area of a section of the rod portion 143b, which is orthogonal to its axis). Because of this, the second valve element 143 is moved so as to protrude into the release chamber 112 by the force of the difference between: a force of the pressurized oil in the release chamber 112 pushing the second valve element 143 downward; and a force of the pressurized oil in the second hydraulic chamber 148 pushing the second valve element 143 upward.

Furthermore, the second detection valve 122 is structured as follows to function as a throttle detection valve. A throttle passage 149 communicatively connecting the air passage 126 to the air passage 127 is provided in a portion of the tubular pressing member 140, which is on a back side relative to the protruding portion 144.

The cylinder device having the above-described structure operates as follows.

Figure 15:
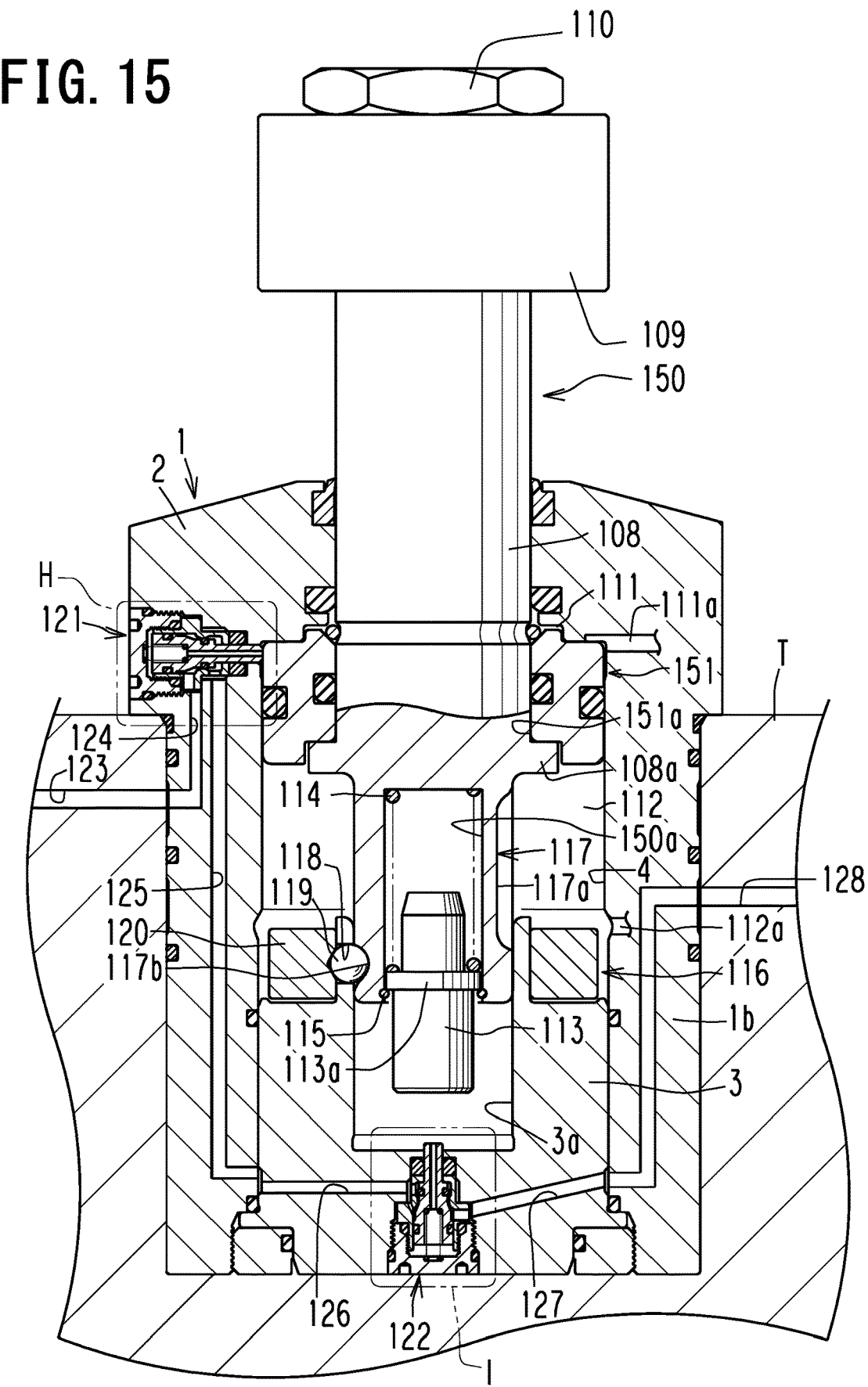
FIG. 15 shows a third embodiment of the present invention, and is an elevational view in section of a cylinder device in the release state.
Figure 16:
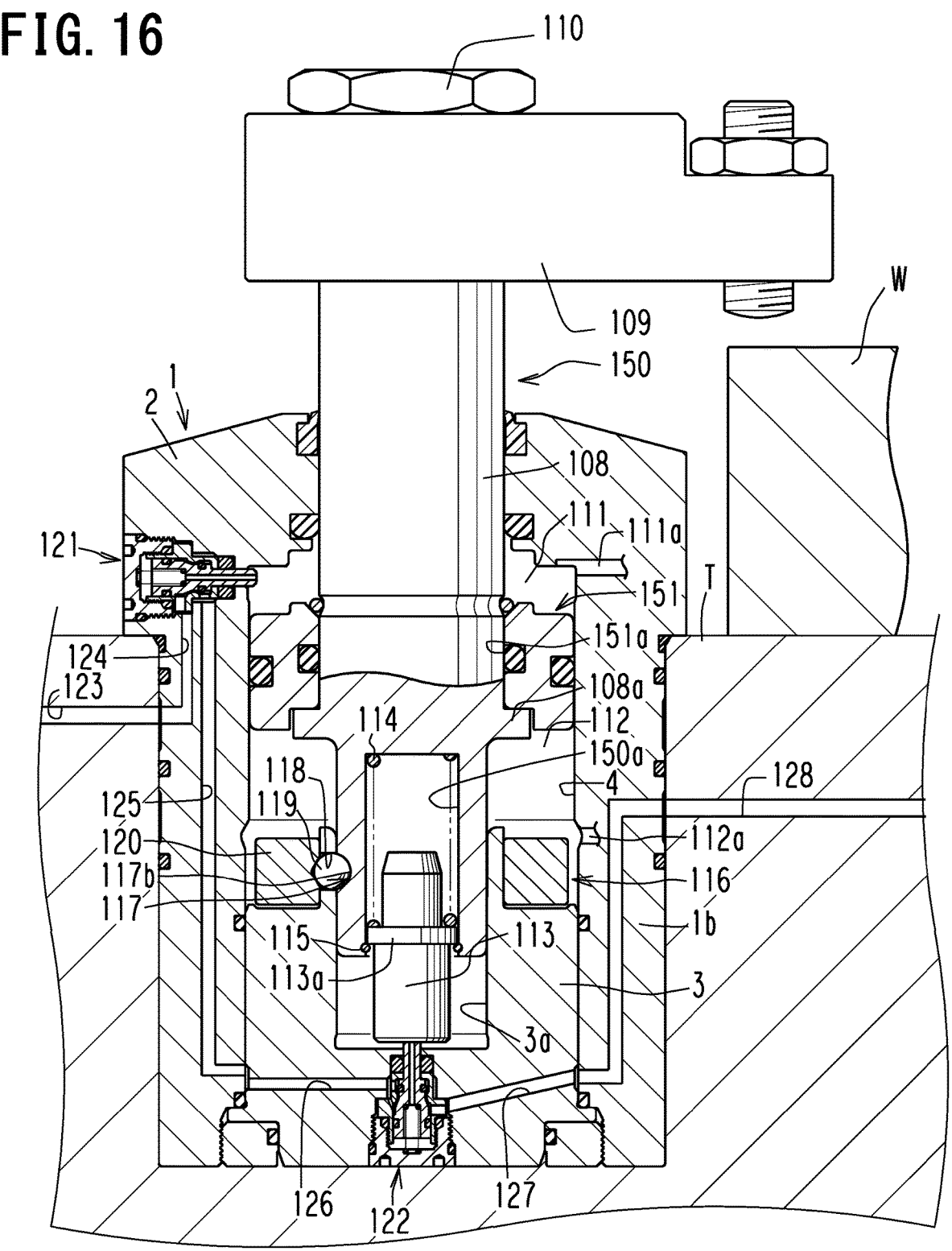
FIG. 16 is an elevational view in section of the cylinder device which is in the course of transition from the release state to the lock state.
Figure 17:
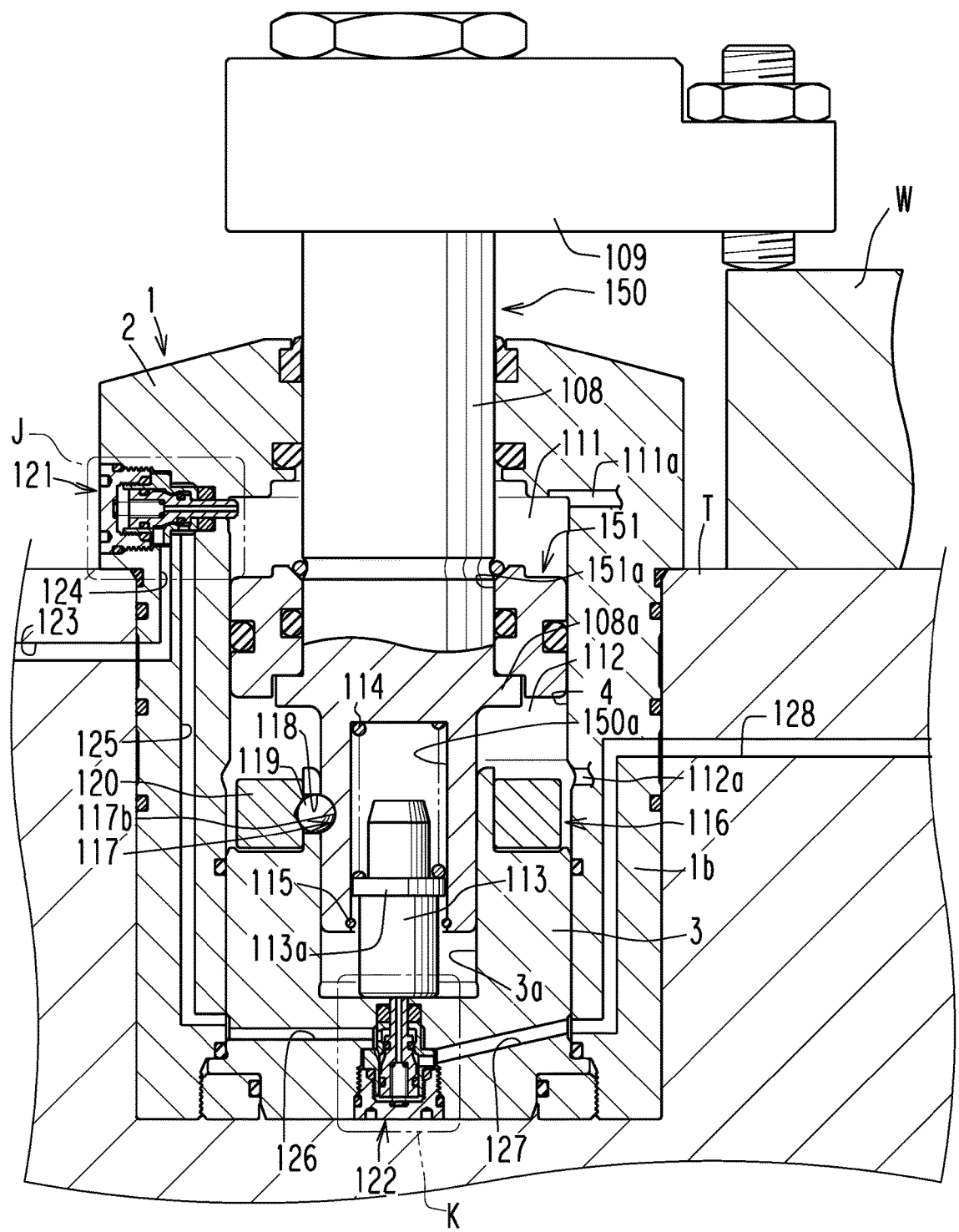
FIG. 17 is an elevational view in section of the cylinder device in the lock state.

To cause the device to transition from the release state shown in FIG. 15 to the lock state shown in FIG. 17, pressurized oil is discharged from the release chamber 112 and pressurized oil is supplied to the lock chamber 111. Then, the pressurized oil supplied to the lock chamber 111 causes the piston main body 151 to move the output rod 108 downward. At the beginning, the output rod 108 descends while rotating in a clockwise direction due to the presence of the output rod rotating mechanism 116. After the piston main body 151 descends a small distance while rotating, the first valve element 133 is moved rightward by a force of the difference between the leftward pushing force by the pressurized oil in the lock chamber 111 and the rightward pushing force by the pressurized oil in the first hydraulic chamber 138 of the first detection valve 121, and by the rightward biasing force by the compression spring 135. As a result, the first detection valve 121 is opened, as shown in FIG. 18B. At this moment, the second detection valve 122 is also open, as shown in FIG. 19A. Due to this, compressed air from the compressed air supply source is discharged to the outside through the air passages 123 to 128. A switch configured to detect the pressure in the air passage 123 or the like detects that the pressure in the air passage is below a first set pressure (first threshold value). As the output rod 108 descends further while rotating, a leading end portion of the clamp arm 109 is moved to a position above a to-be-clamped object W, as shown in FIG. 16. At this moment, a lower end surface of the rod member 113 is in contact with an upper end surface of the second valve element 143 of the second detection valve 122, or there is a small gap between these surfaces. Subsequently, as the piston main body 151 descends straight, the clamp arm 109 presses the object W from above. Then the descent of the output rod 108 stops and the device is into the lock state. In this state, the piston main body 151 pushes and moves the second valve element 143 of the second detection valve 122 downward via the rod member 113, and meanwhile the rod member 113 is inserted into the rod hole 150a of the output rod 108 against the biasing force of the compression spring 114. As a result, the second valve surface 146a of the second detection valve 122 is brought into contact with the second valve seat 144a, to close the second detection valve 122. Due to this, compressed air from the compressed air supply source passes through the air passages 123 to 127 and through the throttle passage 149, and then is discharged to the outside through the air passage 128. In this state, the switch detects that: the pressure in the air passage is higher than the first set pressure (first threshold value); but is below a second set pressure (second threshold value), which has been set to be higher than the first set pressure.

To cause the device to transition from the lock state shown in FIG. 17 to the release state shown in FIG. 15, pressurized oil is discharged from the lock chamber 111 and pressurized oil is supplied to the release chamber 112. Then, the piston main body 151 ascends straight upward due to the pressurized oil into the release chamber 112. However, the output rod 108 pushes the rod member 113 downward via the compression spring 114, and therefore the rod member 113 is left at a lower end position. After the piston main body 151 ascends further to a position at which the annular member 115 is brought in contact with the flange portion 113a of the rod member 113, the output rod 108 lifts the rod member 113 via the annular member 115. At this moment, the second valve element 143 is raised by a force of the difference between: the downward pushing force by the pressurized oil in the release chamber 112; and the upward pushing force by the pressure in the second hydraulic chamber 148, so that the second detection valve 122 is opened. Subsequently, the piston 150 ascends while rotating in a counterclockwise direction due to the presence of the output rod rotating mechanism 116. When the piston main body 151 moves to a position slightly below its upper limit position, the piston main body 151 comes into contact with the rod portion 133b of the first detection valve 121. Then, the piston main body 151 moves the first valve element 133 leftward, to close the first detection valve 121. The piston main body 151 is received by an upper wall of the housing 1, which stops the ascent of the output rod 108, and the device is into the release state. In this state, the switch detects that the pressure in the air passage 123 exceeds the second set pressure.

The first detection valve 121 includes the compression spring 135. Due to this, the rightward biasing force of the compression spring 135 keeps the first valve element 133 protruding into the lock chamber 111 when the pressurized oil in the first hydraulic chamber 138 is discharged through the lock chamber 111. The second detection valve 122 also includes the compression spring 145. Due to this, in the same manner as in the first detection valve 121, the upward biasing force of the compression spring 145 keeps the second valve element 143 protruding into the release chamber 112.

The above-described embodiments are changeable as follows.

In the cylinder device of the first embodiment, the first detection valve 12 and the second detection valve 13 (throttle detection valve) may be replaced with each other. Specifically, the second detection valve 13 (throttle detection valve) may be disposed upstream, and the first detection valve 12 may be disposed downstream. The same applies to the third embodiment.

In the cylinder device of the first embodiment, the route of the air passages 14 and 15 that connect the detection valves 12 and 13 to each other in series may be changed in the housing 1. The same applies to the third embodiment.

Instead of the configuration in which air is supplied to the detection valves 12 and 13, 64 and 65, 121 and 122 from the air supply passage 16, 67, 124 and then is discharged to the air discharge passage 18, 69, 127, the following configuration is also possible in each of the embodiments: air is supplied from the side of the air discharge passage 18, 69, 127 to the detection valves 12 and 13, 64 and 65, 121 and 122, and then is discharged to the side of the air supply passage 16, 67, 124. More specifically, taking the first embodiment as an example, each embodiment is changeable as follows. Instead of the configuration in which air passes through the air supply passage 16 and through the detection valves 12 and 13 in this order, and then air is discharged through the air discharge passage 18, arrangement may be made so that air passes through the air supply passage 16 and through the detection valves 13 and 12 in this order, and then air is discharged through the air discharge passage 18.

As for the second detection valve 13 (throttle detection valve) of the cylinder device of the first embodiment, the second valve element 49 and the throttle member 56 may be unitary with each other. That is, these elements may be made of one material.

Figure 14:
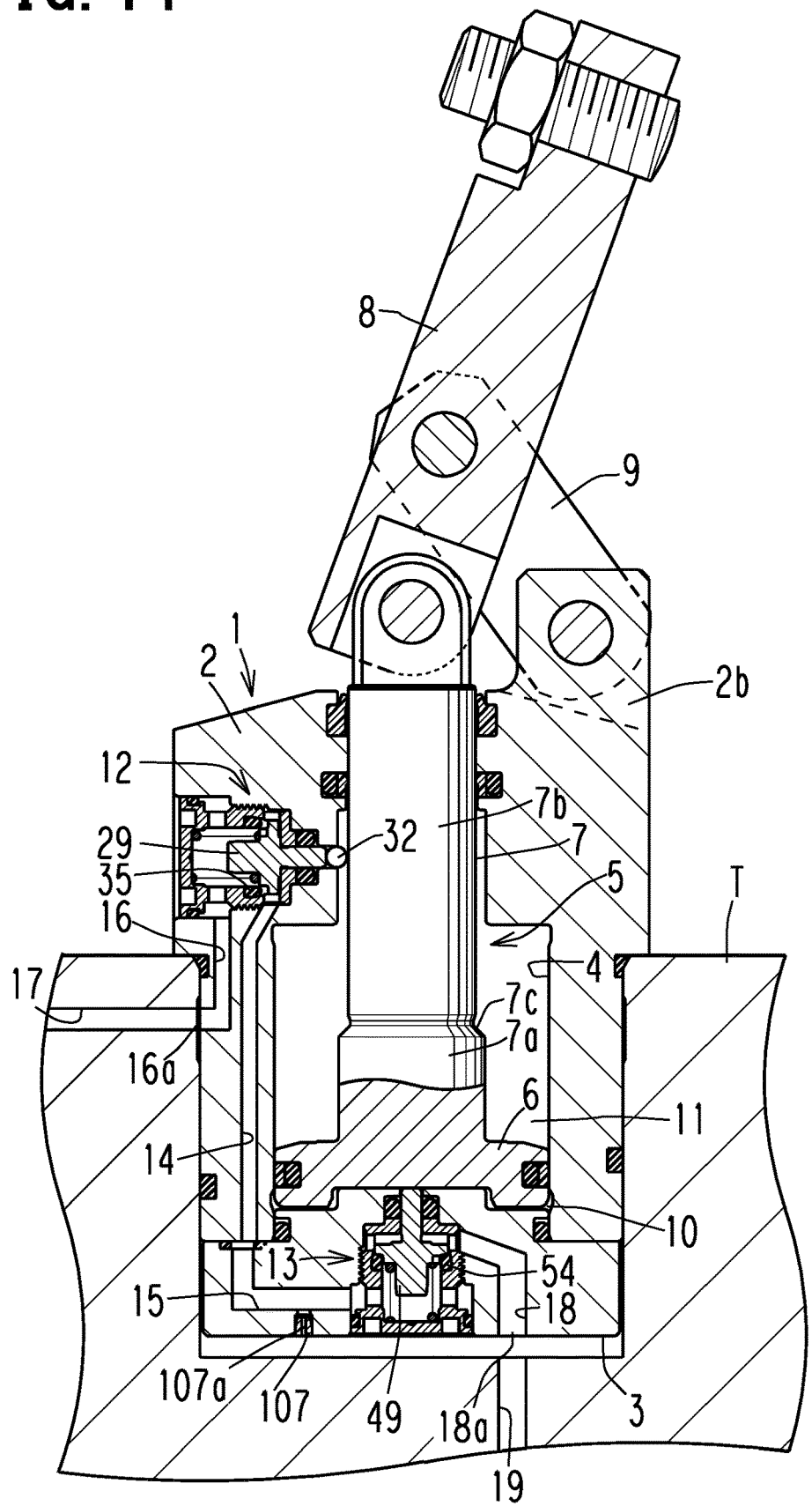
FIG. 14 is a diagram illustrating a throttle detection valve of a modification in which a throttle passage is provided outside, and corresponding to FIG. 1.

The second detection valve 13 (throttle detection valve) has the throttle passage (hole 56a) provided in the detection valve 13. Instead of the configuration in which the throttle passage is provided in the detection valve 13, the throttle detection valve with the throttle passage may have a configuration shown in FIG. 14: a throttle member 107 for the detection valve is provided outside the detection valve 13, for example, to the housing 1; and a throttle passage 107a is provided in the throttle member 107.

The cylinder device of the first embodiment may be arranged so that: no engagement ball 32 is provided; and the large-diameter portion 7a of the output rod 7 directly pushes the rod portion 30 of the first valve element 29 of the first detection valve 12.

In the cylinder device of the first embodiment, the first detection valve 64 of the cylinder device of the second embodiment may be used instead of the first detection valve 12. In the cylinder device of the second embodiment, the first detection valve 12 of the cylinder device of the first embodiment may be used instead of the first detection valve 64.

The second detection valve 65 of the cylinder device of the second embodiment is a normally closed (NC) throttle detection valve, which is closed when no external force is applied. A normally open (NO) valve, which is open when no external force is applied, may be used for the second detection valve 65, and such a normally open (NO) throttle detection valve may be used instead of the second detection valve 13 in the cylinder device of the first embodiment.

In each of the above-described embodiments, two detection valves are used to detect the operational state of the piston (the lock state/release state). Another detection valve may be added for the detection of an overstroke of the piston, in addition to the detection of the lock state/release state. That is, the cylinder device may be arranged to include three or more detection valves.

The first detection valve 12, 64 and the second detection valve 13, 65 (spring operated detection valves) of each of the cylinder devices of the first and second embodiments may be replaced by the first detection valve 121 and the second detection valve 122 (hydraulically operated detection valves) of the cylinder device of the third embodiment, respectively.

Pressure fluid for locking/releasing may be compressed gas such as compressed air and compressed nitrogen gas, instead of pressurized oil.

The cylinder device of the present invention may be applied to clamps other than the link clamp and the rotary clamp. Furthermore, the application is not limited to clamps. The present invention may be applied to other actuators such as a reciprocating device driven by an electric motor and ball screw shafts, gears, and the like.

Embodiments and modifications of the present invention have been hereinabove described. It is a matter of course that other changes or alterations can be made on the present invention within the scope of envisagement of one skilled in the art.

REFERENCE SIGNS LIST

1: housing; 5: piston; 12: first detection valve (detection valve); 13: second detection valve (throttle detection valve); 14: air passage; 15: air passage; 48: valve chamber; 49: second valve element (valve element); 50: rod portion; 52: valve element body; 53a: valve surface; 54a: valve seat; 55: compression spring (biasing means); 56: throttle member; 56a: hole (throttle passage); 57: second detection valve (throttle detection valve); 58: hole (throttle passage); 59: piston; 64: first detection valve (detection valve); 65: second detection valve (throttle detection valve); 66: air passage; 70: groove (throttle passage); 106: throttle passage; 107: throttle member; 107a: throttle passage; 121: first detection valve (detection valve); 122: second detection valve (throttle detection valve); 125: air passage; 126: air passage; 149: throttle passage; 150: piston.

The invention claimed is:

1. A cylinder device comprising:
a housing;
a piston inserted in the housing, the piston being configured to move in an axial direction to a lock side and to a release side;
a first detection valve provided to the housing, the first detection valve being configured to detect an operational state of the piston;
a second detection valve provided to the housing, the second detection valve being configured to detect the operational state of the piston;
an air supply passage provided to the housing, the air supply passage being configured to supply air either to the first detection valve and then to the second detection valve or to the second detection valve and then to the first detection valve; and
at least one air passage provided to the housing, the air passage communicatively connecting the first detection valve and the second detection valve to each other in series, and the air passage being configured to supply air either from the first detection valve to the second detection valve or from the second detection valve to the first detection valve,
wherein the second detection valve among the first and second detection valves is configured as a throttle detection valve including a throttle passage.

2. The cylinder device according to claim 1, wherein the throttle detection valve includes:
a valve element movably inserted in a valve chamber provided in the housing, the valve element being biased by a compression spring housed in the valve chamber; and
a valve seat facing a valve surface of the valve element, and wherein
the throttle passage is provided at a central portion of an end portion of the valve element, the end portion being opposite from a rod portion.

3. The cylinder device according to claim 2, wherein the valve element includes:
a valve element body, at a first end portion of which the rod portion is provided; and
a throttle member fixed to a central portion of a second end portion of the valve element body, the second end portion being opposite from the rod portion, the throttle member having a hole functioning as the throttle passage.

4. The cylinder device according to claim 1, wherein the throttle detection valve includes:
a valve element movably inserted in a valve chamber provided in the housing, the valve element being biased by a compression spring housed in the valve chamber; and
a valve seat facing a valve surface of the valve element, and wherein:
the valve element has a hole functioning as the throttle passage; or a groove functioning as the throttle passage is provided on the valve surface or on the valve seat.

5. The cylinder device according to claim 1, wherein the first detection valve and the second detection valve are provided in a lower end portion of the housing.

6. The cylinder device according to claim 1, wherein at least one of the first detection valve and the second detection valve is closed when the operational state of the piston is a lock state, and at least one of the first and second detection valves is closed when the operational state is a release state.

7. The cylinder device according to claim 1, wherein the throttle detection valve includes a valve element movably inserted in a valve chamber provided in the housing, and a communication passage in which pressure fluid for moving the valve element flows is formed inside the valve element.

* * * * *